United States Patent
Oda et al.

(10) Patent No.: US 7,505,187 B2
(45) Date of Patent: Mar. 17, 2009

(54) OPTICAL SCANNING UNIT AND IMAGE FORMING APPARATUS

(75) Inventors: Ayumu Oda, Nara (JP); Masaki Saka, Nabari (JP); Atsushi Ueda, Nara (JP); Yasuhiro Ono, Kyoto (JP); Makoto Masuda, Nara (JP); Kenzo Ohkubo, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 189 days.

(21) Appl. No.: 11/418,235

(22) Filed: May 5, 2006

(65) Prior Publication Data

US 2006/0262373 A1    Nov. 23, 2006

(30) Foreign Application Priority Data

May 19, 2005    (JP)    ............................. 2005-146555

(51) Int. Cl.
*G02B 26/08*    (2006.01)
(52) U.S. Cl. ...................... 359/205; 359/204; 359/207; 359/216; 347/244
(58) Field of Classification Search ........................ None
See application file for complete search history.

(56) References Cited

U.S. PATENT DOCUMENTS 5,828,479 A * 10/1998 Takano et al. ............... 359/201
6,512,533 B2    1/2003 Tajima et al.
2006/0061848 A1 *    3/2006 Oda ............................ 359/205
2006/0262177 A1 *    11/2006 Wada et al. .................. 347/224

FOREIGN PATENT DOCUMENTS

| JP | 2002-90675 A | 3/2002 |
| JP | 2003-262816 A | 9/2003 |
| JP | 2004-54146 A | 2/2004 |
| JP | 2004-109699 A | 4/2004 |
| JP | 2004-109700 A | 4/2004 |
| JP | 2004-233638 A | 8/2004 |
| JP | 2004-258182 A | 9/2004 |

* cited by examiner

*Primary Examiner*—James Phan
(74) *Attorney, Agent, or Firm*—Birch, Stewart, Kolasch & Birch, LLP

(57) ABSTRACT

According to the present invention, highly accurate adjustment of the angles and positions of optical elements constituting an optical scanning unit can be easily performed.

For a cylindrical lens that makes the light beam for exposing a photoreceptor converge on the surface of the photoreceptor, a frame is provided for holding the cylindrical lens therein. The frame is supported by two support portions for a chassis of the optical scanning unit such that the longitudinal direction of the cylindrical lens becomes parallel to the scanning direction of the photoreceptor. The optical scanning unit is configured such that the angle of the cylindrical lens in the longitudinal direction is adjustable in the sub-scanning direction of the photoreceptor at the support portion on the front side (operational side) of these support portions.

6 Claims, 13 Drawing Sheets

TO POLYGON MIRROR

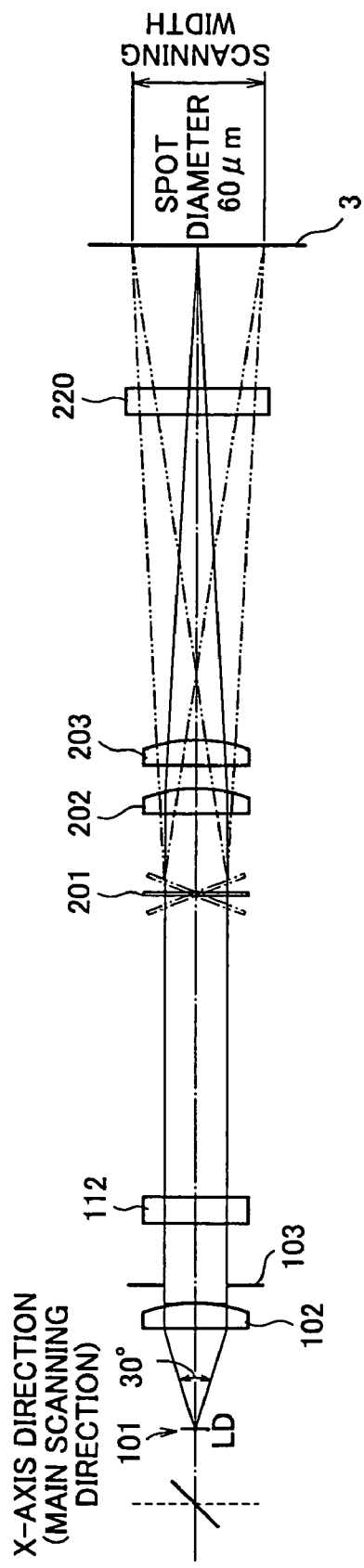
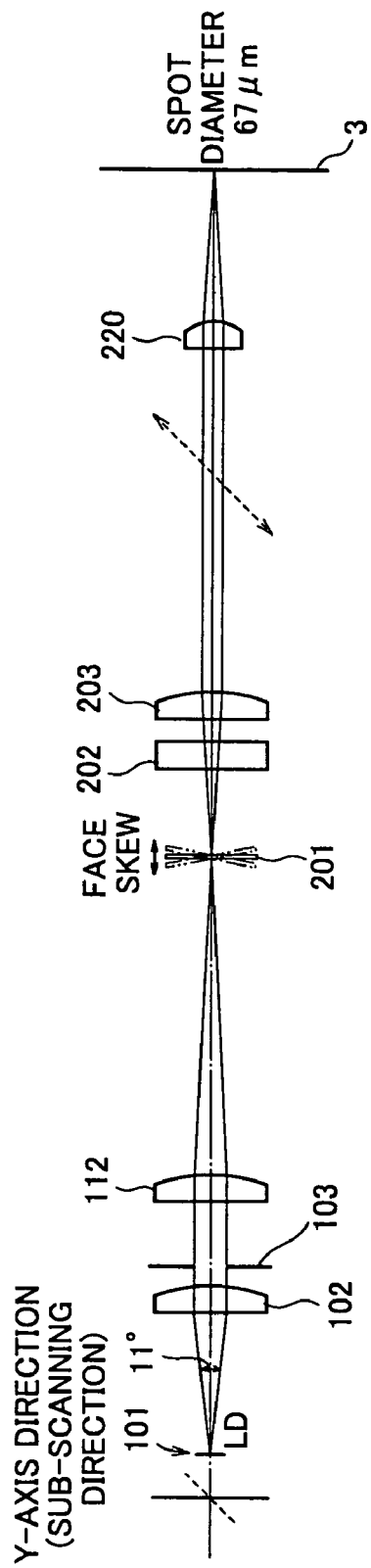

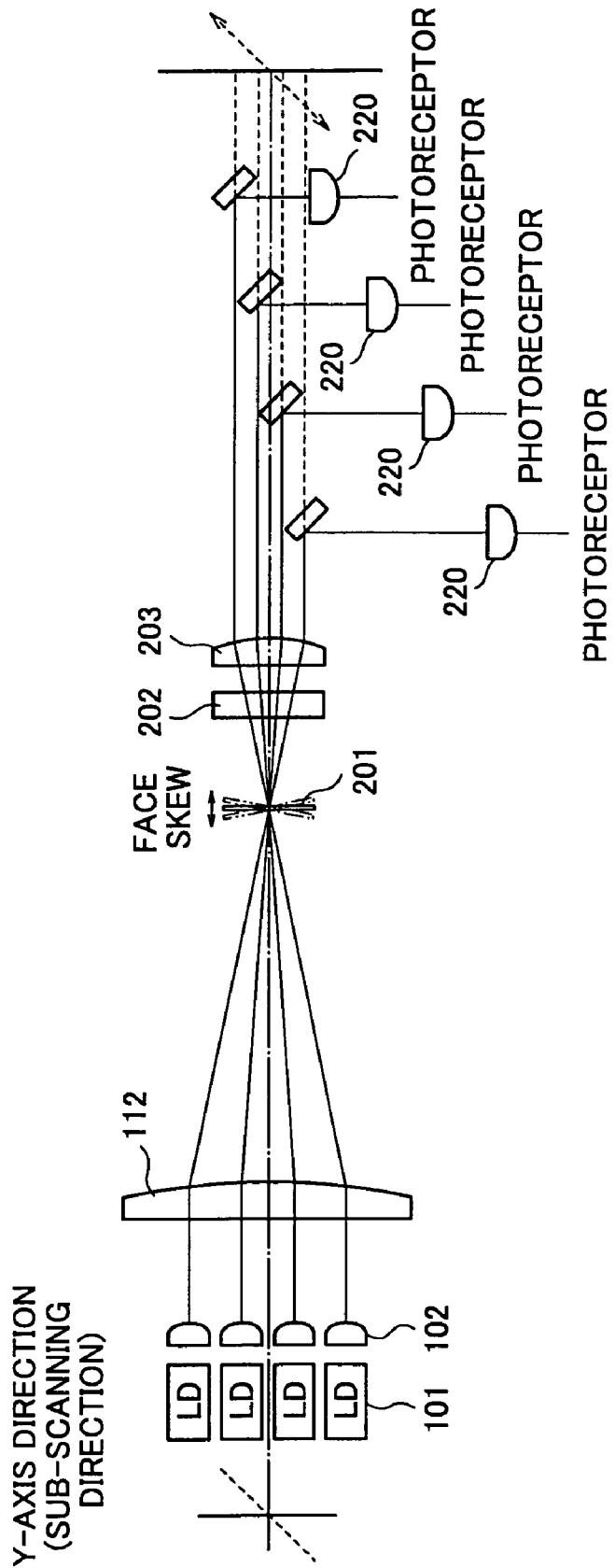

OPTICAL SCANNING UNIT AND IMAGE FORMING APPARATUS

CROSS-NOTING PARAGRAPH

This non-provisional application claims priority under 35 U.S.C. §119(a) on Patent Application No. 2005-146555 filed in JAPAN on May 19, 2005, the entire contents of which are hereby incorporated herein by reference.

FIELD OF THE INVENTION

The present invention relates generally to an optical scanning unit and an image forming apparatus equipped with the optical scanning unit, and, more particularly, to an optical scanning unit used for electrophotographic image forming apparatuses such as digital copy machines, printers, and facsimile machines, for example.

BACKGROUND OF THE INVENTION

Image forming apparatuses such as digital copy machines, laser printers, or facsimile machines are widely used. Such an image forming apparatus uses an optical scanning unit that scans a laser beam. When an image is formed in the image forming apparatus, after a photoreceptor is charged by a charging unit, an electrostatic latent image is formed on the photoreceptor by the optical scanning unit by writing according to image information. The electrostatic latent image on the photoreceptor is developed by toner supplied from a development unit. The toner image developed on the photoreceptor is transferred to recording paper by a transfer unit and is fixed on the recording paper by a fixing unit to obtain a desired image.

Along with speeding up of color image forming apparatuses such as digital copy machines and laser printers, a tandem-mode apparatus is in practical use which includes a plurality of photoreceptors in tandem arrangement. In this case, for example, four photoreceptor drums are arranged in the conveying direction of the recording paper; each photoreceptor is simultaneously exposed to light by a scanning optical system corresponding to each photoreceptor drum to form a latent image; and these latent images are developed by development units that use developers with different colors such as yellow, magenta, cyan, and black. The developed toner images are sequentially transferred on the same recording paper in an overlapping manner to obtain a color image.

As compared to a mode that forms each color image with one photoreceptor sequentially, since the tandem mode exposing a plurality of photoreceptors simultaneously can output color and monochrome images at the same speed, the tandem mode is advantageous in high-speed printing. On the other hand, since scanning optical systems corresponding to a plurality of photoreceptors are necessary, a unit for exposing the photoreceptors tends to be large in size and the challenge is to miniaturize the unit. Another challenge is to eliminate color drift when the toner image developed on each photoreceptor is transferred to the recording paper in an overlapping manner.

With regard to the tandem-mode image forming apparatus as described above, for example, Japanese Laid-Open Patent Publication Nos. 2004-109700 and 2004-109699 disclose an optical scanning unit that includes a wedge-shaped prism disposed on an optical path from a light source unit to deflecting means and a writing start position correcting means for rotating and adjusting the wedge-shaped prism around an optical axis to vary a position of a beam spot in the sub-scanning direction, and the optical scanning unit can control the beam spot position on a photoreceptor drum during the writing of image data. At the time of continuous printing, relative color drift of each color can be corrected effectively to output a good color image with less color drift.

Japanese Laid-Open Patent Publication No. 2004-233638 discloses a lens adjustment apparatus that includes: a light source; a device that divides the light emitted from the light source into four light beams; an adjustment device that drives a second lens on a plane where a normal line is the optical axis of the second lens; a diffraction grating that diffracts the collected light beams from the first and second lenses to generate interference; a micromotion stage that drives the diffraction grating in the direction including a component of a direction vertical to the groove direction of the grating plane; four interference image observation systems that are constituted by an objective lens, an imaging lens, and a CCD camera to observe the interference light; a processing device that processes the four interference images to detect one aberration from aberrations sensitive to the decentering of the second lens; and a control device that detects an adjustment amount from the detected aberration to drive the adjustment device, and the lens adjustment apparatus can adjust a lens with small NA highly accurately.

Japanese Laid-Open Patent Publication No. 2002-90675 discloses an optical scanning unit that includes: an optical deflection device that deflects light in a predetermined direction; a plurality of laser elements; a pre-deflection optical system that includes a glass lens and a plastic lens to convert a cross-sectional shape of light emitted from each laser element into a predetermined shape; and a post-deflection optical system that includes two lenses forming an image such that each of the light deflected by the optical deflection device is scanned on a predetermined image plane at a constant speed. The power of the two lenses of the deflection optical systems is regulated to be positive relative to the direction orthogonal to the rotation axis of the reflection face of the optical deflection device. At least one of the lens surfaces of each of the lenses is formed to be a lens without rotational symmetric surfaces. In this way, an optical scanning unit can be provided which is suitable for an image forming apparatus that can provide a color image without color drift at low cost.

In the optical scanning unit, a multiplicity of optical elements such as lenses and mirrors is disposed at optimum positions. Such optical elements are disposed to guide an optical path of a light beam emitted from a light emitting element composed of a laser diode, to adjust the beam shape, and to illuminate a photoreceptor accurately. In some cases, such optical elements must be adjusted in positions or angles at the time of the assembly adjustment of the unit or after the subsequent operation.

For example, if a mirror is displaced which is disposed before a lens making the light beam converge on the photoreceptor, for example, the writing position of the light beam on the photoreceptor is displaced from an appropriate position, which makes a problem that the quality of the image formed on the photoreceptor is deteriorated. The same applies to other optical elements constituting the optical scanning unit.

With regard to the adjustment of the optical elements, it is preferred that highly accurate adjustment can be easily performed. In this case, adjusting means of the optical element must be able to adjust the angle and position thereof highly accurately without affecting the characteristic of the optical element.

SUMMARY OF THE INVENTION

An object of the present invention is to provide an optical scanning unit that includes an adjusting mechanism capable of performing highly accurate adjustment easily in the adjusting mechanism that adjusts angles and positions of optical elements constituting the optical scanning unit. And another object of the present invention is to provide an image forming apparatus equipped with such an optical scanning unit.

Another object of the present invention is to provide an optical scanning unit that irradiates a polygon mirror with a plurality of light beams emitted from a light source according to image data, that converts the plurality of light beams to scanning lights by the rotation of the polygon mirror, and that scans and exposes a plurality of photoreceptors simultaneously with the plurality of scanning lights to form latent images on the respective photoreceptors, where the optical scanning unit comprises a chassis having a cylindrical lens that makes the light beam for exposing the photoreceptor converge on the surface of the photoreceptor, wherein the cylindrical lens is supported by two support portions for the chassis such that the longitudinal direction of the cylindrical lens becomes. parallel to the scanning direction of the photoreceptor and the optical scanning unit is configured such that the angle of the cylindrical lens in the longitudinal direction is adjustable in the sub-scanning direction of the photoreceptor at one of the support portions.

Another object of the present invention is to provide an optical scanning unit that irradiates a polygon mirror with a plurality of light beams emitted from a light source according to image data, that converts the plurality of light beams to scanning lights by the rotation of the polygon mirror, and that scans and exposes a plurality of photoreceptors with the plurality of scanning lights to form latent images on the respective photoreceptors, where the optical scanning unit comprises a chassis having a cylindrical lens that makes the light beam for exposing the photoreceptor converge on the surface of the photoreceptor and a frame that holds the cylindrical lens therein, wherein the frame is supported by two support portions for the chassis such that the longitudinal direction of the cylindrical lens becomes parallel to the scanning direction of the photoreceptor and the optical scanning unit is configured such that the angle of the cylindrical lens in the longitudinal direction is adjustable in the sub-scanning direction of the photoreceptor at one of the support portions.

Another object of the present invention is to provide the optical scanning unit, wherein the cylindrical lens is made of resin.

Further, another object of the present invention is to provide an image forming apparatus comprising the optical scanning unit and the photoreceptors, wherein the optical scanning unit forms latent images on the photoreceptors, the latent images being developed for image formation.

BRIEF DESCRIPTION OF THE DRAWINGS

FIGS. 5A and 5B are diagrams for describing the state of the individual light beam of each color in the primary optical system and the secondary optical system.

FIG. 6 shows optical paths of four light beams in the sub-scanning direction schematically.

FIGS. 14A to 14D are diagrams for describing a mechanism that fixes a first fixing shaft 221a.

PREFERRED EMBODIMENTS OF THE INVENTION

Figure 1:
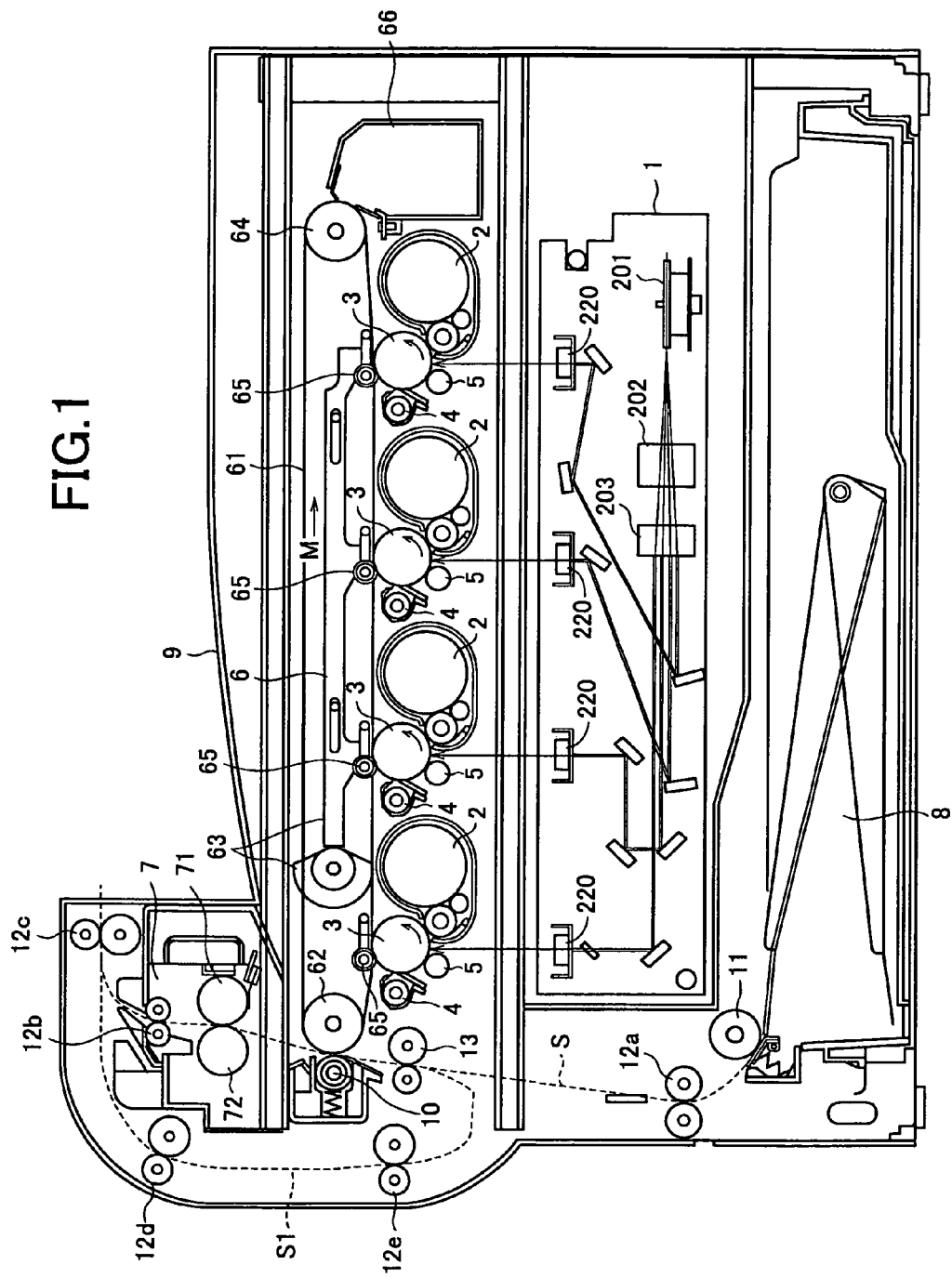
FIG. 1 shows a configuration example of an image forming apparatus using an optical scanning unit of the present invention.

FIG. 1 shows a configuration example of an image forming apparatus using an optical scanning unit of the present invention. The image forming apparatus forms a multicolor or monochrome image on a predetermined sheet (recording paper) depending on image data transmitted from outside. As shown in FIG. 1, the image forming apparatus is constituted by an exposure unit 1, development units 2, photoreceptor drums 3, cleaner units 4, charging units 5, an intermediate transfer belt unit 6, a fixing unit 7, a paper feeding cassette 8, a paper ejection tray 9, etc.

The image data handled in the image forming apparatus correspond to a color image using colors of black (K), cyan (C), magenta (M), and yellow (Y). Therefore, four sets of the development units 2, the photoreceptor drums 3, the charging units 5, and the cleaner units 4 are provided such that four types of latent images according to respective four colors are formed and each set is set to black, cyan, magenta, or yellow to constitute four image stations.

The charging unit 5 is charging means for electrostatically charging the surface of the photoreceptor drum 3 uniformly to a predetermined electric potential and, in addition to the contact type such as roller type or brush type as shown in FIG. 1, a charger type charging unit may be used.

The exposure unit 1 corresponds to the optical scanning unit relating to the present invention and is configured to be a laser scanning unit (LSU) equipped with a laser irradiating portion and a reflecting mirror as shown in FIG. 1. The exposure unit 1 is provided with a polygon mirror 201 that scans laser beams, and optical elements such as lenses and mirrors for guiding the light beams reflected by the polygon mirror 201 to the photoreceptor drums 3. The configuration of the optical scanning unit constituting the exposure unit 1 will be described in detail later. In some techniques, for example, the exposure unit 1 may be an EL or LED writing head where light emitting elements are arranged in an array.

The exposure unit 1 has a function for exposing the charged photoreceptor drums 3 according to the input image data to form electrostatic latent images corresponding to the image data on the surfaces of the photoreceptor drums 3. The development unit 2 develops the electrostatic latent image formed on each photoreceptor drum 3 with toner of each of four colors (Y, M, C, and K). The cleaner unit 4 removes and collects the toner remaining on the surface of the photoreceptor drum 3 after the development and the image transfer.

The intermediate transfer belt unit 6 is disposed above the photoreceptor drums 3 and includes an intermediate transfer belt 61, an intermediate transfer belt driving roller 62, an intermediate transfer belt tension mechanism 63, an intermediate transfer belt driven roller 64, intermediate transfer rollers 65, and an intermediate transfer belt cleaning unit 66. Four intermediate transfer rollers 65 are provided for respective four colors of Y, M, C, and K.

The intermediate transfer belt 61 is laid with tension and is rotationally driven in the direction indicated by an arrow M by the intermediate transfer belt driving roller 62, the intermediate transfer belt tension mechanism 63, the intermediate transfer belt driven roller 64, and the intermediate transfer rollers 65. Each intermediate transfer roller 65 is rotatably supported by an intermediate transfer roller attachment portion of the intermediate transfer belt tension mechanism 63 of the intermediate transfer belt unit 6 and gives a transfer bias for transferring the toner image on the photoreceptor drum 3 onto the intermediate transfer belt 61.

The intermediate transfer belt 61 is provided so as to contact with each photoreceptor drum 3. The intermediate transfer belt 61 has a function for forming a color toner image (multicolor toner image) on the intermediate transfer belt 61 by transferring the toner image of each color formed on the photoreceptor drum 3 sequentially onto the intermediate transfer belt 61 in an overlapping manner. The intermediate transfer belt 61 is formed using a film with a thickness of about 100 μm to 150 μm so as to have no end.

The transfer of the toner image from the photoreceptor drum 3 to the intermediate transfer belt 61 is performed by the intermediate transfer roller 65 in contact with the back side of the intermediate transfer belt 61. To the intermediate transfer roller 65, a high-voltage transfer bias (high voltage with the opposite polarity (+) to the charging polarity (−) of the toner) is applied for transferring the toner image. The intermediate transfer roller 65 is a roller having a base of a metal (e.g., stainless steel) shaft with a diameter of 8 to 10 mm and the surface of the shaft is covered with a conductive elastic material (e.g., EPDM, urethane foam, etc.). With the conductive elastic material, the high voltage can be applied uniformly to the intermediate transfer belt 61. Although the roller shape is used for the transfer electrode in this embodiment, a brush may be used.

The electrostatic image is developed on each photoreceptor drum 3 correspondingly to each color as described above and is laminated on the intermediate transfer belt 61. With the rotation of the intermediate transfer belt 61, the laminated image information is transferred onto paper by a transfer roller 10 (described later) disposed at a contact position between paper and the intermediate transfer belt 61.

The intermediate transfer belt 61 and the transfer roller 10 are pressed against each other with a predetermined nip and a voltage (high voltage with the opposite polarity (+) to the charging polarity (−) of the toner) is applied to the transfer roller 10 to transfer the toner to paper. To obtain the nip constantly with the transfer roller 10, one of the transfer roller 10 and the intermediate transfer belt driving roller 62 is made of a hard material (e.g., metal) and the other utilizes a soft material roller such as an elastic roller (e.g., elastic rubber roller or resin foam roller).

Since color mixture at the next procedure is generated by the toner attached to the intermediate transfer belt 61 by contacting with the photoreceptor drum 3 or by the toner that is not transferred onto paper by the transfer roller 10 and remained on the intermediate transfer belt 61, the toner is configured to be removed and collected by the intermediate transfer belt cleaning unit 66. The intermediate transfer belt cleaning unit 66 includes, for example, a cleaning blade that is a cleaning member contacting with the intermediate transfer belt 61 and the intermediate transfer belt 61 contacting with the cleaning blade is supported by the intermediate transfer belt driven roller 64 from the back side.

The paper feeding cassette 8 is a tray for storing sheets (recording paper) used for forming images and is provided on the under side of the exposure unit 1 of the image forming apparatus. The paper ejection tray 9 is provided on the top side of the image forming apparatus and is a tray for accumulating the printed sheets face-down.

The image forming apparatus is provided with a paper conveying path S in a substantially vertical shape for sending the sheets in the paper feeding cassette 8 to the paper ejection tray 9 via the transfer roller 10 and the fixing unit 7. A pickup roller 11, a plurality of conveying rollers 12a to 12e, a resist roller 13, the transfer roller 10, the fixing unit 7, etc. are disposed near the paper conveying path S from the paper feeding cassette 8 to the paper ejection tray 9.

The conveying rollers 12a to 12e are small rollers for facilitating and aiding the conveyance of the sheets and are provided along with the paper conveying path S. The pickup roller 11 is provided near the end of the paper feeding cassette 8 and picks up the sheets one-by-one from the paper feeding cassette 8 to supply the sheets to the paper conveying path S.

The resist roller 13 holds the sheet conveyed through the paper conveying path S temporarily. The resist roller 13 has a function for conveying the sheet to the transfer roller 10 at the timing when the leading end of the toner image on the photoreceptor drums 3 is matched with the leading end of the sheet.

The fixing unit 7 includes a heat roller 71 and a pressure roller 72, and the heat roller 71 and the pressure roller 72 hold the sheet and are rotated. The heat roller 71 is set to be a predetermined fixing temperature by a controlling portion based on a signal from a temperature detector not shown and performs the thermocompression of the toner to the sheet along with the pressure roller 72 to melt/mix/press the multicolor toner image transferred to the sheet to thermally fix the image to the sheet.

Detailed description will be made of the sheet conveying path. As described above, the image forming apparatus is provided with the paper feeding cassette 8 preliminary storing the sheets. To feed the sheets from the paper feeding cassette 8, the pickup roller 11 is disposed to guide the sheets to the conveying path S one-by-one.

The sheet fed from the paper feeding cassette 8 is conveyed to the resist roller 13 by a conveying roller 12a on the paper conveying path S and is conveyed to the transfer roller 10 at the timing of matching accurately the leading end of the sheet with the leading end of the image information on the intermediate transfer belt 61, and the image information is written onto the sheet. Subsequently, when the sheet passes through the fixing unit 7, the unfixed toner on the sheet is thermally melted and fixed and the sheet passes through a conveying roller 12c disposed behind the fixing unit 7 and is ejected on the paper ejection tray 9.

The above conveying path is used when one-side printing is requested for the sheet and, when two-side printing is requested, after the one-side printing is completed as described above and the rear end of the sheet which has passed through the fixing unit 7 is chucked by the final conveying roller 12c, the conveying roller 12c is rotated reversely to guide the sheet to conveying rollers 12d, 12e. Subsequently, after the sheet passes through the resist roller 13 and the back side of the sheet is printed, the sheet is ejected on the paper ejection tray 9.

Specific description will be made of the embodiment of the optical scanning unit of the present invention.

The optical scanning unit of the embodiment can be applied to the tandem-mode image forming apparatus that has a plurality of the photoreceptor drums 3 as described above to form a color image by simultaneously scanning and exposing the photoreceptor drums 3 with a plurality of light beams to form images with different colors on the respective photoreceptor drums 3 and by overlapping the images of respective colors on the same transfer medium.

As described above, the image forming apparatus is provided with the photoreceptor drum for forming a black (K) image, the photoreceptor drum for forming a cyan (C) image, the photoreceptor drum for forming a magenta (M) image, and the photoreceptor drum for forming a yellow (Y) image at substantially even intervals. Since the image of each color is formed simultaneously, the tandem-mode image forming apparatus can reduce the time for forming a color image considerably.

In the following description, K, C, M, and Y stand for black, cyan, magenta, and yellow, respectively.

The optical scanning unit according to the present invention for exposing the photoreceptor drums 3 is constituted by a primary optical system (incoming optical system) and a secondary optical system (outgoing optical system). The primary optical system includes four semiconductor lasers emitting Y, M, C, and K light beams, respectively, and optical elements such as mirrors and lenses guiding these light beams to a polygon mirror 201 (rotational polygon mirror) of the secondary optical system. The secondary optical system includes the polygon mirror 201 that scans the laser beams on the photoreceptor drums 3, i.e., scanned objects, optical elements such as mirrors and lenses guiding the light beams reflected by the polygon mirror 201 to the photoreceptor drums 3, and a BD sensor that detects the light beams. The polygon mirror 201 is configured to be shared by each color.

Figure 2:
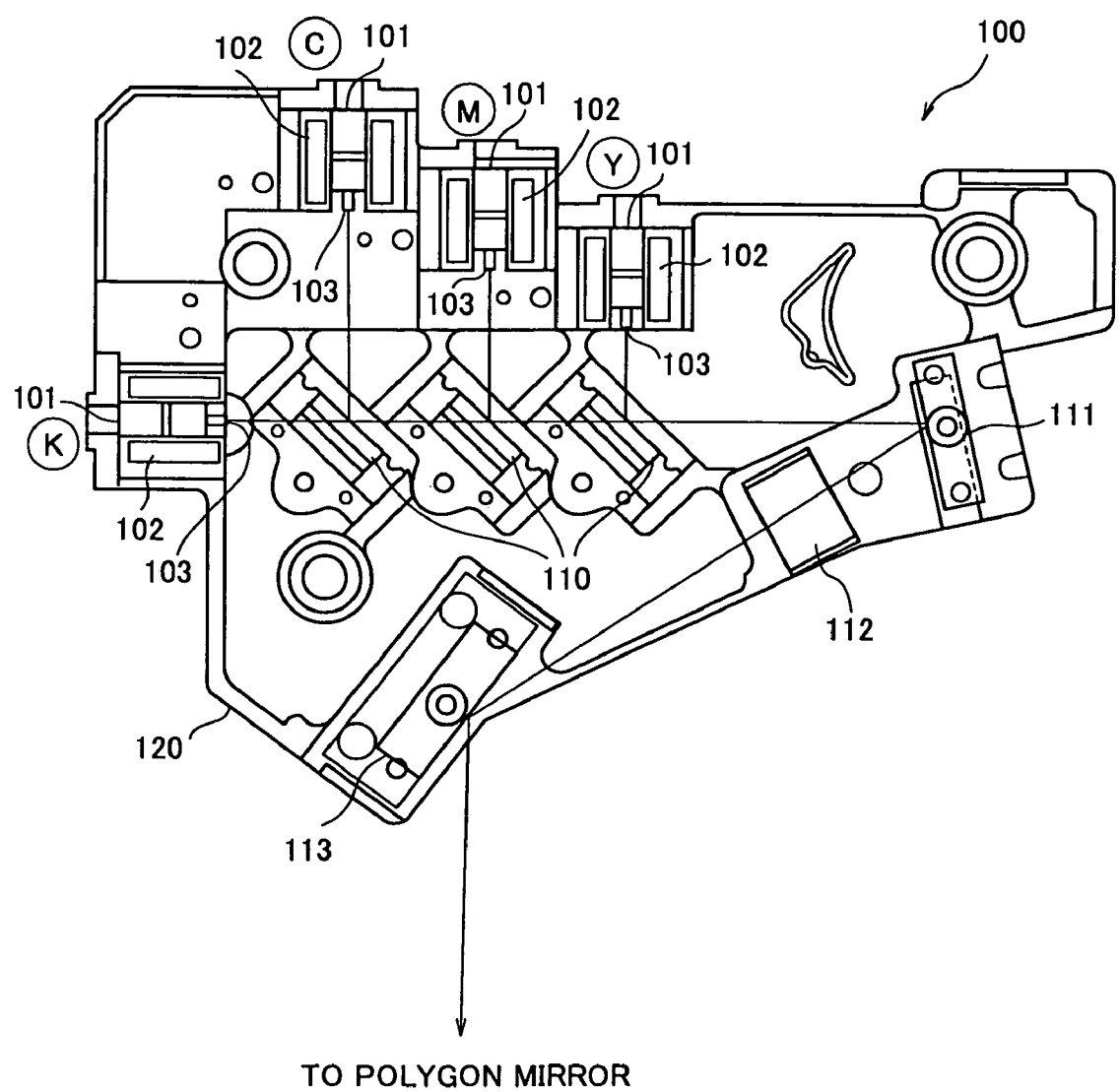
FIG. 2 is a plan view of a configuration example of a primary optical system unit of the optical scanning unit of the present invention.
Figure 3:
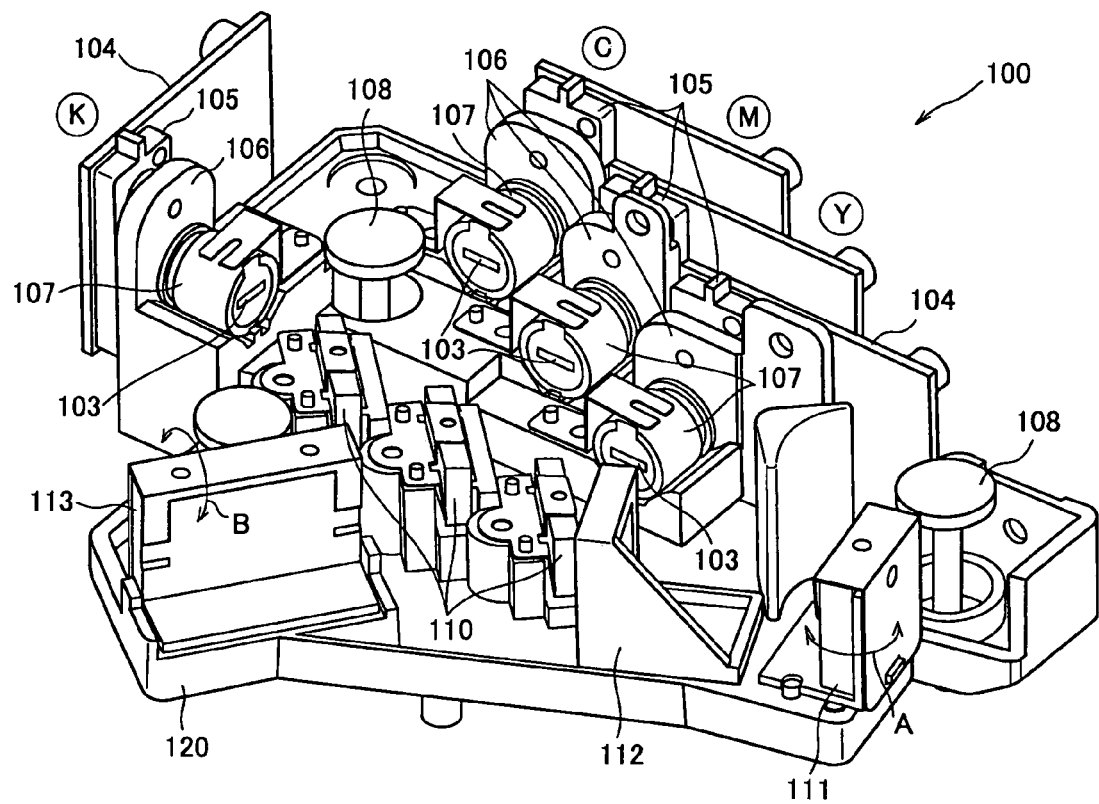
FIG. 3 is a perspective schematic diagram of the primary optical system unit of FIG. 2.

FIG. 2 is a plan view of a configuration example of the primary optical system unit of the optical scanning unit of the present invention and FIG. 3 is a perspective schematic diagram of the primary optical system unit of FIG. 2. In FIGS. 2 and 3, a numeral 100 is the primary optical system unit; a numeral 101 is a laser diode; a numeral 102 is a collimator lens; a numeral 103 is an aperture; a numeral 104 is a laser drive substrate; a numeral 105 is a laser holder; a numeral 106 is a lens holder; a numeral 107 is a body tube; a numeral 108 is a attachment screw; a numeral 110 is a first mirror; a numeral 111 is a second mirror; a numeral 112 is a cylindrical lens; a numeral 113 is a third mirror; and a numeral 120 is a base for installing the optical elements of the primary optical system.

Each of K, C, M, and Y laser diodes 101 is driven by a laser drive circuit (not shown) that is light source driving means. The laser drive circuit receives various control signals output from a controlling portion of the image forming apparatus and the image data supplied from an image processing portion and controls the emission of each laser diode 101 in accordance with these control signals and image data.

On the laser emitting side of each laser diode 101, the collimator lens 102 is provided for K, C, M, and Y. The light beam output from each laser diode 101 is diffused light in a substantially elliptical shape and is converted to parallel light by the collimator lens 102 provided for each color. After the collimator lens 102 for each color, an aperture (slit) 103 with a predetermined gap is provided to regulate the diameter of the light beam. In this specification, the parallel light indicates the state that the diameter of the light flux does not change as the beam travels, and this state is differentiated from the state that optical axes of a plurality of beams are parallel to each other.

Each laser diode 101 is attached to the laser holder 105. The laser holder 105 is attached to the back side of the lens holder 106 formed integrally on the base of the primary optical system. The body tube 107 provided with the collimator lens 102 and the aperture 103 is provided to the front side of the lens holder 106. The light beam emitted from the laser diode 101 exits to the front and outside of the body tube 107 through the collimator lens 102 and the aperture 103.

The light beam emitted from the body tube 107 of the K laser diode 101 goes to the second mirror 111 through the K collimator lens 102 and the K aperture 103. The light beams emitted from the body tubes 107 of the C, M, and Y laser diodes 101 enter into the first mirror 110 through the C, M, and Y collimator lenses 102 and apertures 103, respectively. The first mirror 110 is constituted by three mirrors individually reflecting the C, M, and Y light beams, and the light beam of each color reflected by the mirror travels in the traveling direction of the K light beam and is made incident on the second mirror 111.

The laser diode 101 of each color is disposed at a different height in the sub-scanning direction (direction vertical to the substrate surface). The difference in the height is set to about 2 mm, for example. The first mirror 110 is disposed at a position where only the light beam emitted from the corresponding laser diode 101 is reflected. The three (C, M, and Y) mirrors constituting the first mirror 110 are respectively disposed at a position overlapping with the light beam emitted from the K laser diode 101 in the main scanning direction.

With the configuration as described above, the K light beam emitted from the K laser diode 101 and the C, M, and Y light beams reflected by the first mirror 110 are completely matched in the main scanning direction, have the displacement (vertical difference) in the sub-scanning direction, and are made incident on the second mirror 111 while the optical axes of these light beams are parallel to each other. The light beam of each color emitted from each collimator lens 102 is the parallel light with the diameter of the light flux not changed as the light beam travels.

The second mirror 111 makes the incident light beam of each color K, C, M, and Y incident on the cylindrical lens 112. The cylindrical lens 112 is disposed for focusing the incident light beam of each color in the sub-scanning direction. The light beam of each color emitted from the cylindrical lens 112 is reflected by the third mirror 113 and made incident on the reflection face of the polygon mirror 201.

The cylindrical lens 112 has a lens power in the sub-scanning direction and is set such that the light beam converges in the vicinity of the reflection face of the polygon mirror 201 in the sub-scanning direction depending on the optical path length from the cylindrical lens 112 to the polygon mirror 201. That is, the light beam of each color is made incident on the cylindrical lens 112 while each light beam is the parallel light and converges approximately at the surface of the reflection face of the polygon mirror 201 in the sub-scanning direction. At the same time, the light beam of each color is made incident on the cylindrical lens 112 while the optical axes are parallel to each other and converges at approximately the same position of the surface of the polygon mirror 201.

Since the cylindrical lens 112 does not have a lens power in the main scanning direction, the incident light beam of each color is emitted directly as the parallel light in the main scanning direction and is made incident on the reflection face of the polygon mirror 201. Typically, in the main scanning direction, the parallel light is made incident on the polygon mirror 201. The convergent light in the main scanning direction is not preferable since a negative field curvature is generated by the fθ lens described later. In the sub-scanning direction, to correct a face skew of the reflection face, the light beams are made convergent at the surface of the reflection face. For example, in the sub-scanning direction, the position of the light beam made incident on the reflection face of the polygon mirror 201 is in the vicinity of the center in the height direction of the reflection face.

In the optical scanning unit of the embodiment, four light beams for Y, M, C, and K are deflected by one polygon mirror 201 of the secondary optical system. In this case, the four light beams must be divided after being reflected by the polygon mirror 201 and the displacement in the main scanning direction must not be generated in the light beam for each color. Therefore, the four light beams emitted from the cylindrical lens 112 of the primary optical system are set to be made incident on the polygon mirror 201 at the same position from the same direction in the main scanning direction and are set to be made incident on substantially the same position from the directions with angle differences in the sub-scanning direction. Such optical path setting is achieved by the arrangement of the laser diodes 101 with the vertical differences in the sub-scanning direction since all the light beams for the respective colors are matched in the main scanning direction and travel with predetermined vertical differences in the sub-scanning direction. Therefore, the light beam for each color can be divided by the scanning optical system.

In the above configuration, since the light beam for each color is the parallel light and the optical axes thereof are parallel to each other on the optical path from the collimator lens 102 to the cylindrical lens 112 for each color in the primary optical system, the optical path length from the collimator lens 102 to the cylindrical lens 112 can be freely set.

Figure 4A:
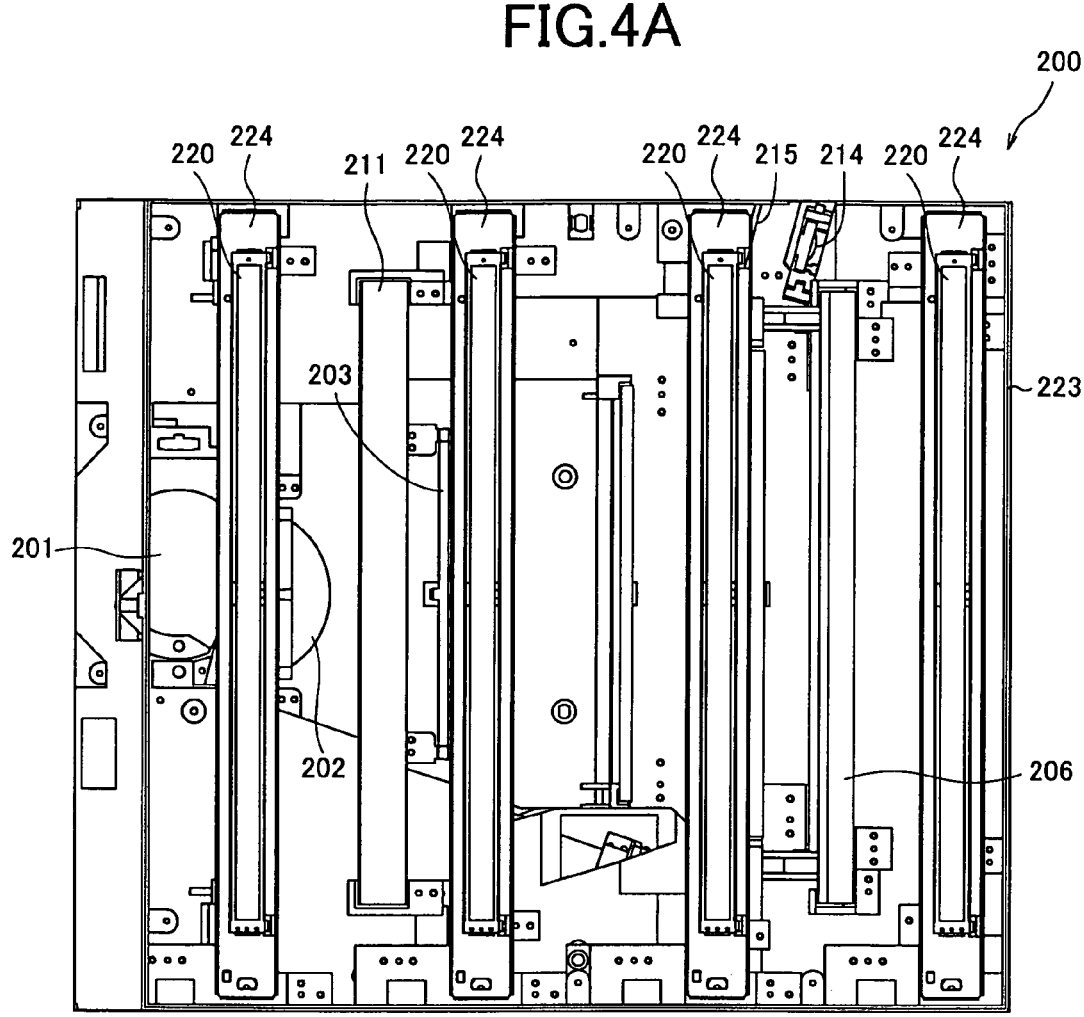
FIGS. 4A and 4B show a configuration example of a secondary optical system of the optical scanning unit.
Figure 4B:
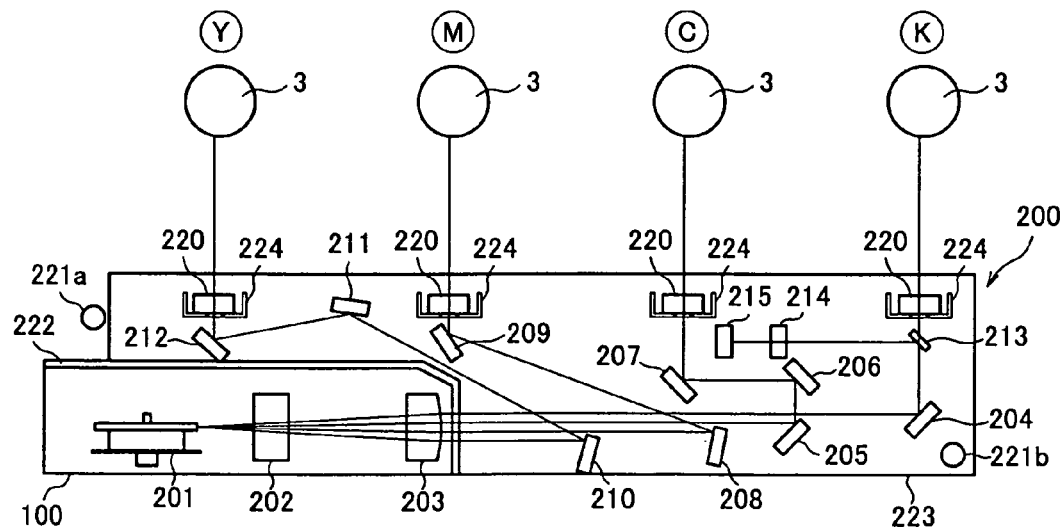

FIGS. 4A and 4B show a configuration example of the secondary optical system of the optical scanning unit; FIG. 4A shows a configuration diagram of the inside of the chassis of the secondary optical system unit viewed from above; and FIG. 4B shows a general configuration of the inside of the chassis 223 and the photoreceptor from a lateral view. In FIGS. 4A and 4B, a numeral 200 is a secondary optical system unit; a numeral 201 is a polygon mirror; a numeral 202 is a first fθ lens; a numeral 203 is a second fθ lens; a numeral 204 is a K mirror; a numeral 205 is a first C mirror; a numeral 206 is a second C mirror; a numeral 207 is a third C mirror; a numeral 208 is a first M mirror; a numeral 209 is a second M mirror; a numeral 210 is a first Y mirror; a numeral 211 is a second Y mirror; a numeral 212 is a third Y mirror; a numeral 213 is a synchronous mirror; a numeral 214 is a BD sensor lens; a numeral 215 is a BD sensor; a numeral 220 is a cylindrical lens for each color; numerals 221a, 221b are fixing shafts; a numeral 222 is a installation position of the primary optical unit; a numeral 223 is a chassis; and a numeral 224 is a frame holding the cylindrical lens.

The polygon mirror 201 has a plurality of (e.g., seven) reflection faces in the rotation direction and is rotationally driven by a polygon motor not shown. The polygon motor is installed in a concave portion on the back side of the chassis 223 where the polygon mirror 201 is installed and a cover is provided for sealing the concave portion. The polygon motor is provided with fins for heat release. The light beam of each color is emitted from the laser diode 101 of the primary optical system, is reflected by the third mirror 113, is reflected by the reflection face of the polygon mirror 201 of the secondary optical system, and scans the photoreceptor drum 3 through the subsequent optical elements.

Each laser beam made incident on the polygon mirror 201 with the angle difference in the sub-scanning direction maintains the angle difference and is divided after passing through the scanning optical system constituted by the first fθ lens 202 and the second fθ lens 203.

The first fθ lens 202 has a lens power in the main scanning direction. Therefore, in the main scanning direction, the parallel light beam emitted from the polygon mirror 201 converges to be a predetermined beam diameter on the surface of the photoreceptor drum 3. The first fθ lens 202 has a function that converts the light beam moved in the main scanning direction at a constant angular speed by the constant angular speed movement of the polygon mirror 201 such that the light beam moves on a scanning line on the photoreceptor drum 3 at a constant linear speed.

The second fθ lens 203 has a lens power in the sub-scanning direction. Therefore, in the sub-scanning direction, the diffused light beam emitted from the polygon mirror 201 is converted to the parallel light. The second fθ lens 203 also has a lens power in the main scanning direction and complements the function of the first fθ lens 202 to enable the control of the beam diameter and the constant linear speed movement of the beam to be performed accurately.

The first fθ lens 202 and the second fθ lens 203 are made of resin. To form an aspheric shape for obtaining desirable characteristics of the fθ lenses, it is preferable to use a resin material for the fθ lenses. Especially, since the second fθ lens 203 has a lens power in both the main scanning direction and the sub-scanning direction, it is preferable to create the second fθ lens 203 with a resin material to obtain a complex aspheric shape that realizes this characteristic. The optimum resin material is selected in consideration of transparency, formability, optical elasticity rate, heat resistance, hygroscopic property, mechanical strength, cost, etc.

Among four light beams for the respective colors divided by the polygon mirror 201 and passing through the first and second fθ lenses 202, 203, the K light beam passes through the first and second fθ lenses 202, 203, is reflected by the K mirror 204, passes through the K cylindrical lens 220, and is made incident on the photoreceptor drum 3 (K). On the photoreceptor drum 3, drawing is performed on the scanning region.

The divided Y light beam is reflected by the first to third Y mirrors 210, 211, 212, passes through the Y cylindrical lens 220, and is made incident on the photoreceptor drum 3 (Y). Similarly, the divided C light beam is reflected by the first to third C mirrors 205, 206, 207, passes through the C cylindrical lens 220, and is made incident on the photoreceptor drum 3 (C). The divided M light beam is reflected by the first and second M mirrors 208, 209, passes through the M cylindrical lens 220, and is made incident on the photoreceptor drum 3 (M).

In the secondary optical system, the cylindrical lens 220 for each color has a lens power in the sub-scanning direction. Therefore, in the sub-scanning direction, the parallel incident light beam converges to be a predetermined beam diameter on the photoreceptor drum 3. In the main scanning direction, the light beam becomes a convergent light in the aforementioned first fθ lens and converges directly on the photoreceptor drum 3. The cylindrical lens 220 is made of resin. For the long cylindrical lens 220 covering the entire scanning width such as the optical scanning unit, it is preferred for the lens to be formed as a resin lens.

The charged photoreceptor drum 3 is exposed to the light beam of each color emitted from the cylindrical lens 220 according to the image data. In this way, an electrostatic latent image corresponding to the image data is formed on the surface of the photoreceptor drum 3. Each electrostatic latent image formed on each photoreceptor drum 3 is developed with toner of Y, M, C, or K by the development unit.

Description will be made of the state of the light beam of each color among the optical elements in the aforementioned embodiment in an organized way. FIGS. 5A and 5B are diagrams for describing the state of the individual light beam of each color in the primary optical system and the secondary optical system; FIG. 5A shows a shape of one light beam in the main scanning direction schematically; and FIG. 5B shows a shape of one light beam in the sub-scanning direction schematically.

Description will be made of the behavior of the light beam in the main scanning direction shown in FIG. 5A. The light beam emitted from the laser diode 101 of the primary optical system is the diffused light and is made incident on the collimator lens 102. In the main scanning direction, the angle of the diffused light from the laser diode 101 is about 30 degrees.

The collimator lens 102 converts the incident diffused light to the parallel light, which is emitted. The aperture 103 is provided after the collimator lens 102, and the diameter of the light beam is regulated by the opening of the aperture 103. The opening diameter of the aperture 103 in the main scanning direction is about 7 mm in this case.

The light beam of the parallel light emitted from the aperture 103 is reflected by the first mirror 110 and the second mirror 111 (only the second mirror 111 for K) (not shown in FIG. 5A) and is made incident on the cylindrical lens 112 of the primary optical system. Since the cylindrical lens 112 of the primary optical system does not have a lens power in the main scanning direction, the incident parallel light passes through without change.

The light beam of the parallel light emitted from the cylindrical lens 112 is reflected by the third mirror 113 (not shown in FIG. 5A) and is made incident on the reflection face of the polygon mirror 201. As shown in the figure, the reflection face of the polygon mirror 201 changes its angle in the main scanning direction along with the rotation of the polygon mirror 201.

The light beams of the parallel light reflected by the polygon mirror 201 move in the main scanning direction at a constant angular speed, are made incident on the first fθ lens 202, and are then made incident on the second fθ lens 203. The first fθ lens 202 and the second fθ lens 203 have a lens power in the main scanning direction and convert the parallel incident light beam to the convergent light converging on the surface of the photoreceptor drum 3. The light beams moving in the main scanning direction at a constant angular speed are converted such that the light beams move on the scanning line on the photoreceptor drum 3 at a constant linear speed.

The second fθ lens 203 is a lens that complements the first fθ lens 202 and corrects the light beam emitted from the first fθ lens 202 such that the light beam behaves as intended.

The optical path between the second fθ lens 203 and the photoreceptor drum 3 is provided with the mirror(s) (one or a plurality of mirrors for each color) (not shown in FIG. 5A) for folding and guiding the optical path of each color to the target photoreceptor drum 3 and the cylindrical lens 220 of the secondary optical system. Since the cylindrical lens 220 does not have a lens power in the main scanning direction, the light beam emitted from the second fθ lens 203 is not affected in the main scanning direction and travels to the photoreceptor drum 3. On the photoreceptor drum 3, the spot diameter of the light beam in the main scanning direction is about 60 μm.

Description will be made of the behavior of the light beam in the sub-scanning direction shown in FIG. 5B. The light beam emitted from the laser diode 101 is the diffused light and is made incident on the collimator lens 102, as is the case with the main scanning direction. However, in the sub-scanning direction, the angle of the diffused light from the laser diode 101 is about 11 degrees, which is smaller than that in the main scanning direction.

The collimator lens 102 converts the incident diffused light to the parallel light, which is emitted. The aperture 103 is provided after the collimator lens 102, and the diameter of the light beam is regulated by the opening of the aperture 103. The opening diameter of the aperture 103 is about 2 mm in this case.

The light beam of the parallel light emitted from the aperture 103 is reflected by the first mirror 110 and the second mirror 111 (only the second mirror 111 for K) (not shown in FIG. 5B) and is made incident on the cylindrical lens 112 of the primary optical system. Since the cylindrical lens 112 of the primary optical system has a lens power in the sub-scanning direction, the incident parallel light is converted to the convergent light that approximately converges on the reflection face of the polygon mirror 201. The light beam of the parallel light emitted from the cylindrical lens 112 is reflected by the third mirror 113 (not shown in FIG. 5B) and is made incident on the reflection face of the polygon mirror 201. In the sub-scanning direction, the light beam converges at approximately the center of the reflection face in the height direction. The face skew of the reflection face is corrected by generating a conjugate relationship between the reflection face of the polygon mirror 201 and the surface of the photoreceptor drum 3.

The light beam reflected by the polygon mirror 201 becomes the diffused light, is made incident on the first fθ lens 202, and is then made incident on the second fθ lens 203. Since the first fθ lens 202 does not have a lens power in the sub-scanning direction, the light beam of the diffused light made incident on the first fθ lens 202 passes through without change.

The second fθ lens 203 has a lens power in the sub-scanning direction and converts the incident diffused light beam to the parallel light in the sub-scanning direction.

The optical path between the second fθ lens 203 and the photoreceptor drum 3 is provided with the mirror(s) (one or a plurality of mirrors for each color) (not shown in FIG. 5B) for folding and guiding the optical path of each color to the target photoreceptor drum 3 and the cylindrical lens 220 of the secondary optical system. The cylindrical lens 220 has a lens power in the sub-scanning direction, and the light beam of the parallel light emitted from the second fθ lens 203 is converted to the light approximately converging on the surface of the photoreceptor drum 3. On the photoreceptor drum 3, the spot diameter of the light beam in the sub-scanning direction is about 67 μm.

FIG. 6 shows optical paths of four light beams in the sub-scanning direction schematically. With regard to the optical paths of the light beams for the four colors Y, M, C, and K, as described above, although the four light beams travels through the same position in the main scanning direction, in the sub-scanning direction, the four light beams emitted from the laser diodes 101 are apart from each other by the height differences of the laser diodes 101.

As shown in FIG. 6, the four light beams are emitted from the four laser diodes 101 (for Y, M, C, and K), pass through the collimator lenses 102, and are made incident on the cylindrical lens 112 of the primary optical system with the optical axes thereof parallel to each other. The cylindrical lens 112 converts each of the four light beams such that the light beams converge at approximately the center of the reflection face of the polygon mirror 201. That is, in the sub-scanning direction, the four light beams converge at approximately the same position on the reflection face of the polygon mirror 201 with angle differences to each other. In the main scanning direction, the four beams are made incident at the same position on the reflection face of the polygon mirror 201 from the same direction. In FIG. 6, the first to third mirrors 110 to 113 are not shown.

The four light beams reflected by the polygon mirror 201 are diffused again with angle differences to each other and made incident on the second fθ lens 203 via the first fθ lens 202. Since the first fθ lens 202 does not have a lens power in the sub-scanning direction, the four light beams made incident on the first fθ lens 202 pass through without change. The second fθ lens 203 has a lens power in the sub-scanning direction and converts the four incident light beams such that the optical axes thereof become parallel to each other.

The optical path between the second fθ lens 203 and the photoreceptor drum 3 is provided with the mirror(s) (one or a plurality of mirrors for each color) (not shown in FIG. 6) for folding the optical path of each color and guiding it to the target photoreceptor drum 3, and these mirrors utilize the displacements of the optical axes of the four light beams emitted from the second fθ lens 203 to separate and guide the four beams to the respective target photoreceptor drums 3. The lengths of the optical paths between the second fθ lens 203 and the cylindrical lenses 220 in the secondary optical system are the same for all the four light beams for the respective colors.

Description will be made of an installation example of a BD (Beam Detect) sensor for detecting the light beam to generate a reference signal for starting writing before the start of the main scanning of the light beam on the photoreceptor drum 3.

Among the light beams reflected by the polygon mirror 201 toward the photoreceptor drum 3, the light beam used for forming an image on the photoreceptor drum 3, i.e., the light beam for scanning a main scanning line is referred to as a main scanning beam. An image region is defined as a spacial region passed through by the main scanning beam at the time of the scanning, and a non-image region is defined as a region other than the image region.

When the light beam scans the photoreceptor drum 3, the light beam scans the main scanning line periodically. Since the photoreceptor drum 3 is rotated, the photoreceptor drum 3 is scanned at a different place every certain period. Every time the scanning of the light beam is performed, the writing start position on the scanning line must be the same.

To detect the writing start position on the scanning line, the optical scanning unit is provided with a synchronous detector. With reference to FIGS. 4A and 4B, the synchronous detector is constituted by a BD sensor (synchronous detection sensor) 215 for detecting a synchronous detection beam that is the light beam in the non-image region, a folding mirror (synchronous mirror) 213 of the synchronous detection beam that is guiding means for guiding the synchronous detection beam to the BD sensor 215, and a BD sensor lens 214 for collecting the synchronous detection beam to the BD sensor 215.

The synchronous detection beam is a signal for synchronization and is the light beam which is reflected by the synchronous mirror 213 after being emitted from the polygon mirror 201 and passing through the first and second fθ lenses 202, 203. The synchronous detection beam is folded by the synchronous mirror 213 and arrives at the BD sensor 215 via the BD sensor lens 214. The BD sensor 215 outputs a sensor signal depending on a received light amount. A controlling portion of the optical scanning unit (e.g., an LSU controller described later) generates a synchronous signal (BD signal) for determining the image writing start position based on the sensor signal from the BD sensor 215. Specifically, the BD signal is generated if the received light amount of the BD sensor 215 is equal to or more than a light amount necessary at least for exposing the photoreceptor drum 3 with the laser beam to form an electrostatic latent image. The BD signal is used for a scanning start reference signal in the main scanning direction and the writing start position on each line is synchronized in the main scanning direction based on this signal.

The synchronous detector outputs an error signal if the BD sensor 215 cannot detect the light beam. The image forming apparatus equipped with the optical scanning unit stops the operation of the apparatus and displays, for example, a predetermined service code on the display screen to notify a user of the failure in the writing start position in the scanning direction.

The BD sensor 215 detecting the writing start position in the scanning direction is provided only on the optical path of the K light beam to support only the K light beam among the four light beams and, with reference to its detection result, the light beams for other colors start the scanning at the predetermined writing start timing of the image data.

In this embodiment, in addition to the BD sensor 215 for detecting the writing start position in the main scanning direction of the light beam, a BD sensor is provided for detecting the writing position in the sub-scanning direction of each color of Y, M, C, and K. Among the BD sensors for detecting the writing positions in the sub-scanning direction, the BD sensor for K may be used in conjunction with the BD sensor 215 for detecting the writing start position in the main scanning direction.

Figure 7:
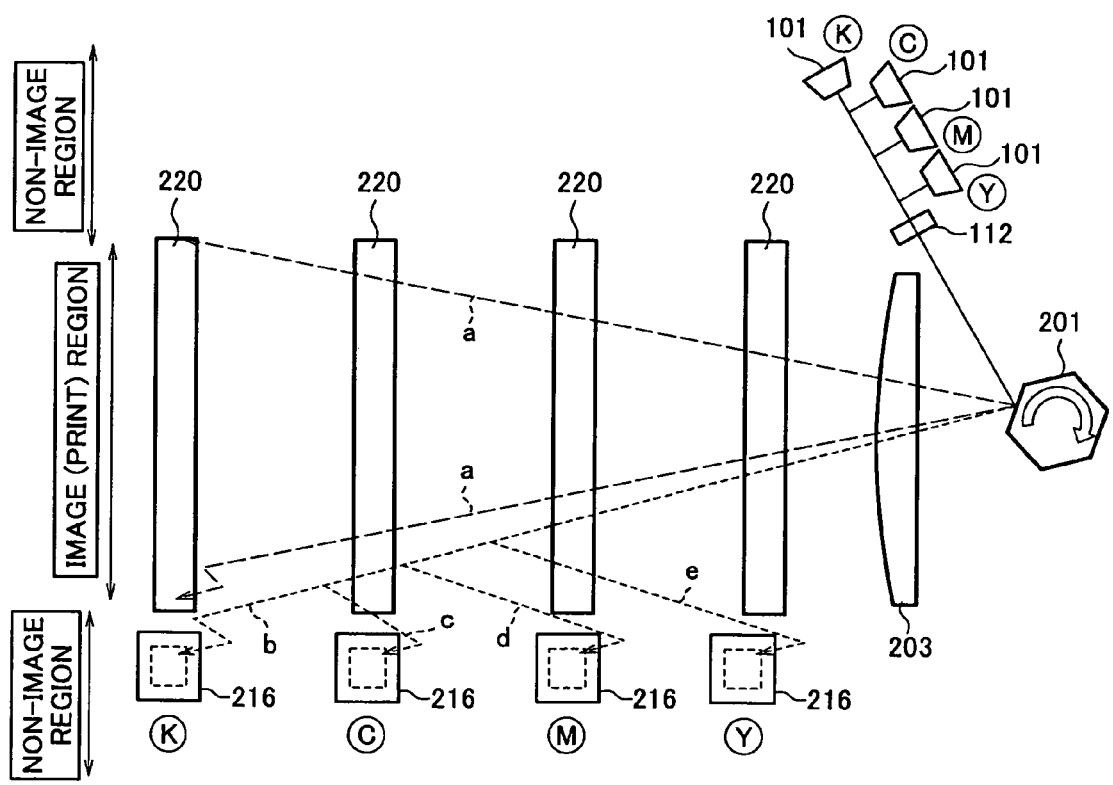
FIG. 7 shows a configuration of the BD sensor detecting the writing position in the sub-scanning direction of the light beam schematically.

FIG. 7 schematically shows a configuration of the BD sensor detecting the writing position in the sub-scanning direction of the light beam and, in this figure, a numeral 216 is the BD sensor for detecting the writing position in the sub-scanning direction; a dotted line a indicates an optical path indicating the image region of the K light beam; dotted lines b to e indicate optical paths of light beams for the respective colors in the non-image region. FIG. 7 shows the arrangement of the BD sensors 216 schematically; the elements such as mirrors and lenses are not shown; and the optical paths are simplified. In the cylindrical lens 220, scanning widths are the same for the light beams for the colors of Y, M, C, and K.

As shown in FIG. 7, the secondary optical system is provided with four BD sensors 216 for the respective colors for detecting the writing positions in the sub-scanning direction. The BD sensors 216 for the respective colors are disposed at positions where the light beams for the respective colors of Y, M, C, and K in the non-image region can be detected to determine whether the writing position in the sub-scanning direction is appropriate or not.

It is preferred to dispose the BD sensors 216 directly in the non-image forming region on the optical paths of the light beams traveling toward the photoreceptor drums 3 to achieve a simple configuration. Because of the limitation of the space in the non-image region part, if the BD sensors 216 are wished to be disposed at desirable positions in the secondary optical system, for example, at positions without other optical elements, which are out of the optical paths and have spatial margins, folding mirrors can be employed suitably for the respective colors to guide the light beams in the non-image region to the respective BD sensors 216.

As is the case with the BD sensor 215 for detecting the writing start position in the main scanning direction, the BD sensor 216 for detecting the writing position in the sub-scanning direction determines whether or not the writing position in the sub-scanning direction is appropriate for each light beam, based on whether the light beam can be detected or not. The optical scanning unit outputs an error signal if the BD sensor 216 for each color cannot detect the light beam. The image forming apparatus equipped with the optical scanning unit stops the operation of the apparatus and displays, for example, a predetermined service code on the display screen to notify a user of the failure in the writing position in the sub-scanning direction. Adjustment will be performed after verifying the cause such as emission failure in the laser diodes 101 for the error-detected colors or misalignment of the mirrors or other optical elements on the optical paths.

The BD sensor 216 for detecting the writing position in the sub-scanning direction and the BD sensor 215 for detecting the writing start position in the main scanning direction can be configured to detect the light beam emitted from the cylindrical lens 220 of the secondary optical system or can be configured to detect the light beam on the optical path before the cylindrical lens 220 of the secondary optical system.

If the light beam is detected after the cylindrical lens 220 of the secondary optical system, since the light beam is narrowed by the cylindrical lens 220 in the main scanning direction and the sub-scanning direction, the power of the light beam per unit area at the sensor is increased. Therefore, the light beam can be detected if the sensitivity of the BD sensor 216 is relatively reduced.

If the light beam is detected before the cylindrical lens 220 of the secondary optical system, especially if the light beam is detected between the second fθ lens 203 and the cylindrical lens 220 of the secondary optical system, since the respective beams emitted from the second fθ lens 203 travel in the sub-scanning direction with the optical axes thereof parallel to each other, the tolerance of the positioning is increased for the installation of the BD sensors 215, 216 and the BD sensors 215, 216 can be configured integrally with the unit, which is effective for the miniaturization of the apparatus or the improvement of the installation accuracy (adjustment accuracy of the light beam). Alternatively, a sensor with a relatively low accuracy can be applied to the BD sensors 215, 216.

As described above, with regard to the installation positions of the BD sensors 215, 216, different effects can be obtained for a case where the sensors are provided before the cylindrical lens 220 of the secondary optical system and a case where the sensors are provided after it, and optimum positions can be selected suitably in accordance with the intended detection accuracy, sensors to be used, or spatial conditions for disposing the BD sensors 215, 216. Since the BD sensors 215, 216 can be configured integrally with the optical scanning unit, the miniaturization of the apparatus or the improvement of the sensor installation accuracy (improvement of the adjustment accuracy of the light beam) can be achieved.

Figure 8A:
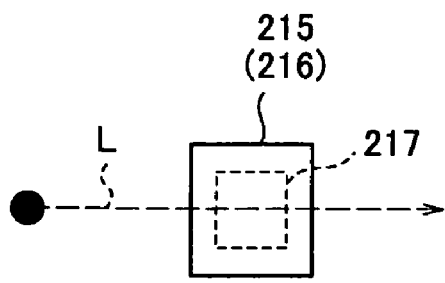
FIGS. 8A to 8C are diagrams for describing a configuration example of the BD sensor that can be applied to the embodiment.
Figure 8B:
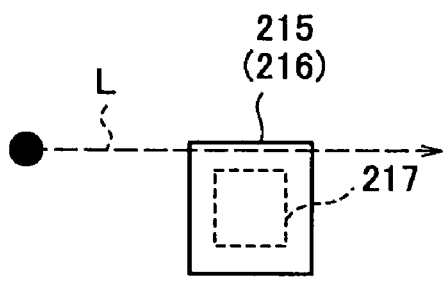
Figure 8C:
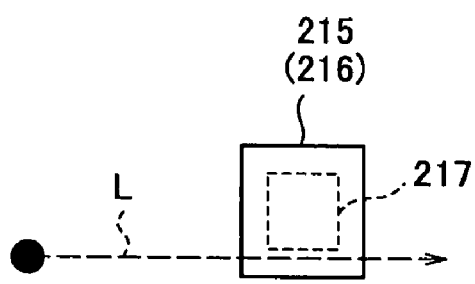

FIGS. 8A to 8C are diagrams for describing a configuration example of the BD sensor that can be applied to the embodiment. The configuration of FIGS. 8A to 8C can be applied to both the BD sensor 216 for detecting the writing position in the sub-scanning direction and the BD sensor 215 for detecting the writing start position in the main scanning direction. FIG. 8A shows a configuration example of a typical BD sensor, and the BD sensor 215 (216) includes a light receiving portion 217 composed of a photodiode with a size of about 2 cm square, for example. When the optical scanning unit (LSU unit) is manufactured, the unit is assembled such that a light beam L is made incident at the center position of the light receiving portion 217.

When configured as described above, for example, if printing disturbance such as printing deviation is generated, the error signal is output when the light beam L is almost out of the light receiving portion 217 as shown in FIG. 8B or 8C. That is, if the area of the light receiving portion 217 is large relative to the beam diameter of the light beam L, the detection accuracy is relatively reduced.

Figure 9:
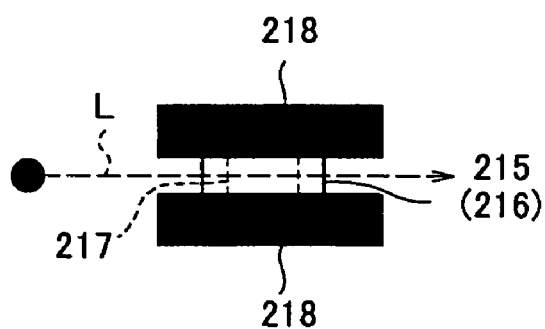
FIG. 9 is a diagram for describing a configuration example of installing a mask to increase the detection accuracy of the BD sensor.

In this embodiment, as shown in FIG. 9, a mask 218 is applied to the light receiving portion 217 of the BD sensor 215 to increase the detection accuracy. In the mask 218, a slit is formed to open only the narrower area of the light receiving portion 217. The slit is formed to have a width of about 1 mm, for example. Because of this slit, when the light beam L is made incident on the exposed light receiving portion, it is determined that the writing position of the light beam L is appropriate, and when the position of the light beam is slightly moved to be out of the opening of the slit, the light receiving portion 217 cannot detect the light beam L and an error is generated. With this configuration, the detection accuracy of the light beam position can be increased in the BD sensor 215 (216).

Figure 10:
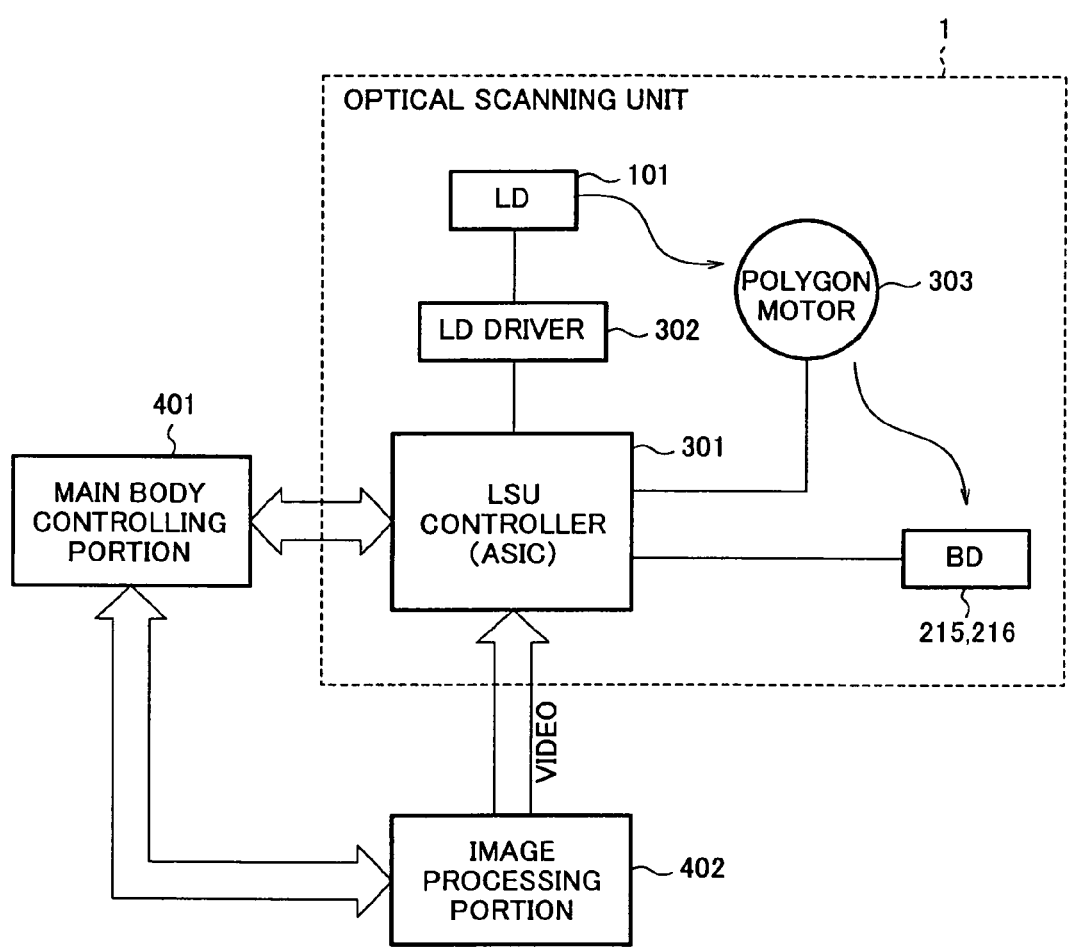
FIG. 10 is a block diagram for describing a configuration example of a control system of the optical scanning unit.

FIG. 10 is a block diagram for describing a configuration example of a control system of the optical scanning unit.

An LSU controller 301 inputs the image data signal output from an image memory, etc. of an image processing portion 402 of the image forming apparatus and sends the image data signal to a laser driver circuit (LD Driver) 302 in conformity with the scanning start timing sent from a main body controlling portion 401 of the image forming apparatus to control the lighting of the laser diode (LD) 101.

The LSU controller 301 controls the reference rotation movement of a polygon motor 303 driving a polygon mirror in conformity with the specification in the main scanning direction of the image forming apparatus. The LSU controller 301 detects the timing of the main scanning through the reception of the light beam at the BD sensor 215 detecting the writing start position in the main scanning direction and outputs an error signal to the main body controlling portion 401 if an error is generated. The LSU controller 301 inputs the detection signal of the BD sensor 216 detecting the writing position in the sub-scanning direction and outputs an error signal to the main body controlling portion 401 if an error is generated. The LSU controller 301 is constituted by ASIC (application specific integrated circuits).

Description will be made of an adjustment mechanism of the optical elements in the embodiment. The optical scanning unit of the embodiment includes several adjustment mechanisms for the optical elements such as mirrors and lenses on the optical path guiding the light beam emitted from the laser diode 101 to the photoreceptor drum 3 of each color. The adjustment mechanisms can adjust angles and positions of the optical elements relative to the light beams made incident on the optical elements. The adjustment mechanisms can perform the adjustment suitably at the time of the assembly adjustment of the optical scanning unit or at a given point in time after the assembly.

The optical scanning unit of the embodiment includes the adjustment mechanisms for the second mirror 111 and the third mirror 113 of the primary optical system and the cylindrical lenses 220 of the secondary optical system. The mechanisms for adjusting angles and positions are included not only in these optical elements but also in the folding mirror of the secondary optical system, etc. appropriately. For example, the writing start position in the main scanning direction detected by the BD sensor 215 is adjusted by changing the angle of the final mirror before the cylindrical lens 220 of the secondary optical system.

Description will be made of the adjustment mechanisms of the second and third mirrors 111, 113 of the primary optical system. In the optical scanning unit of the embodiment, the angles of the second mirror 111 and the third mirror 113 of the primary optical system are independently and variably set. The second mirror 111 and the third mirror 113 function to take partial charge of the optical path adjustment of the light beam in the main scanning direction and the sub-scanning direction, respectively.

The angle of the second mirror 111 can be adjusted in the direction of an arrow A shown in FIG. 3. That is, the second mirror 111 is configured such that the reflection optical paths of the four light beams, which are emitted from the laser diodes 101 and have the parallel optical axes in the sub-scanning direction, are adjustable in the main scanning direction. Although the configuration for varying the angle of the second mirror 111 is not limited, for example, a support member is provided for rotatably supporting the second mirror 111 (or a frame portion holding the second mirror 111) so that it can be rotated in the direction of the arrow A and the support member is fixed on the base 120 of the primary optical system. The support member is provided with an adjustment screw that contacts with the back side of the second mirror 111 to be advanced or retracted in the direction for rotating the second mirror 111 in the direction of the arrow A. An adjuster can suitably adjust the adjustment screw to change the tilt of the second mirror 111 to adjust the optical path in the main scanning direction of the light beam emitted from the second mirror 111. Biasing means such as a spring may be provided for biasing the second mirror 111 such that the second mirror 111 follows the movement of the adjustment screw when the adjustment screw is adjusted in the direction away from the second mirror 111.

The angle of the third mirror 113 can be adjusted in the direction of an arrow B shown in FIG. 3. That is, the third mirror 113 is configured such that the reflection optical paths of the four light beams, which are emitted from the laser diodes 101 and have the parallel optical axes in the sub-scanning direction, are adjustable in the sub-scanning direction. Although the configuration for varying the angle of the third mirror 113 is not limited as is the case with the second mirror 111, for example, a support member is provided for rotatably supporting the third mirror 113 (or a frame portion holding the third mirror 113) so that it can be rotated in the direction of the arrow B and the support member is fixed on the base 120 of the primary optical system. The support member is provided with an adjustment screw that contacts with the back side of the third mirror 113 to be advanced or retracted in the direction for rotating the third mirror 113 in the direction of the arrow B. An adjuster can suitably adjust the adjustment screw to change the tilt of the third mirror 113 to adjust the optical path in the sub-scanning direction of the light beam emitted from the third mirror 113. Biasing means such as a spring may be provided for biasing the third mirror 113 such that the third mirror 113 follows the movement of the adjustment screw when the adjustment screw is adjusted in the direction away from the third mirror 113.

In the above configuration, the optical path adjustment can be performed with the second and third mirrors 111, 113 in the main scanning direction and the sub-scanning direction, respectively, at the positions on the optical path before and after the cylindrical lens of the primary optical system.

In another configuration example of the second mirror 111 and the third mirror 113, the angle adjustment may be performed not only in either the main scanning direction or the sub-scanning direction but also in both the main scanning direction and the sub-scanning direction. This mechanism can be applied to one or both of the second mirror 111 and the third mirror 113.

In this case, for example, a frame portion is provided for holding the second/third mirror 111, 113 such that the second/third mirror 111, 113 can be displaced in both the main scanning direction and the sub-scanning direction, and the contact adjustment screw is provided on one point of the back side of the second/third mirror 111, 113. When the adjustment screw is adjusted and the back side is pushed, that portion may be advanced toward the front side to enable the angle adjustment in the main scanning and sub-scanning directions as a result. In this case, biasing means such as a spring may also be provided for biasing the second/third mirror 111, 113 such that the second/third mirror 111, 113 follows the movement of the adjustment screw when the adjustment screw is adjusted in the direction away from the second/third mirror 111, 113.

The adjustment mechanism of the second/third mirror 111, 113 is configured such that the adjustment mechanism can be operated from one side of the unit configured to be the optical scanning unit. This side of the unit is arranged to be the operational side (front side) of the image forming apparatus when the optical scanning unit is incorporated into the image forming apparatus. With such a configuration, the second/third mirror 111, 113 can be adjusted easily from the operational side of the image forming apparatus.

Description will be made of an example of an angle adjustment mechanism of the cylindrical lens 220 of the secondary optical system. The longitudinal direction of the cylindrical lens 220 of the secondary optical system must be parallel to the center axis of the photoreceptor drum 3. Secondary optical system unit of this embodiment is provided with mechanisms that can adjust the angles of the cylindrical lenses 220 of the secondary optical system relative to the photoreceptor drums 3.

Figure 11:
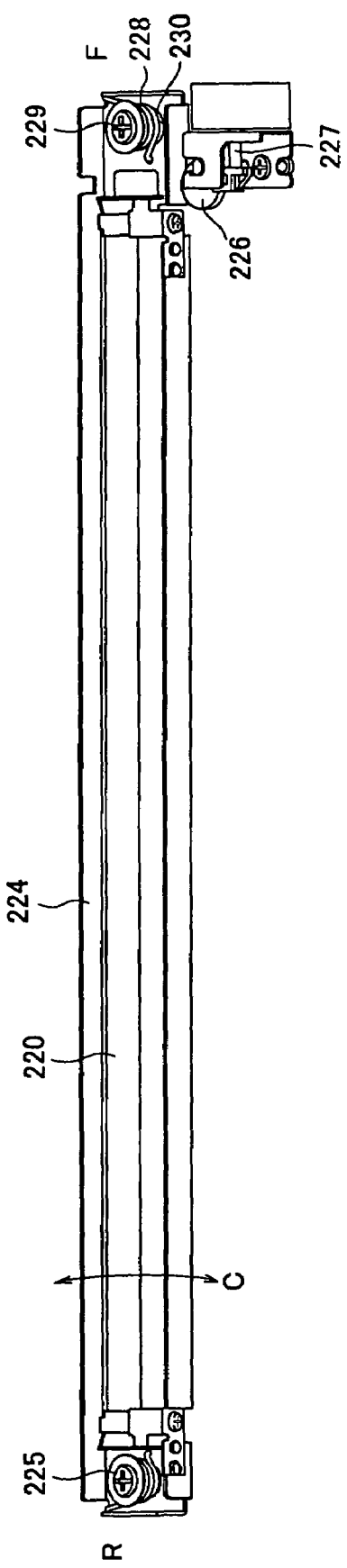
FIG. 11 is a diagram for describing an angle adjustment mechanism of a cylindrical lens of the secondary optical system.

FIG. 11 is a diagram for describing the angle adjustment mechanism of the cylindrical lens 220 of the secondary optical system and is a perspective schematic diagram of the cylindrical lens 220 and the holding mechanism for it. In FIG. 11, a numeral 224 is a frame holding the cylindrical lens; a numeral 225 is a rear supporting portion; a numeral 226 is an eccentric cam; a numeral 227 is an adjustment screw; a numeral 228 is a spring member; a numeral 229 is a front supporting portion; and a numeral 230 is an elongate hole provided in the frame. R indicates the rear side of the apparatus and F indicates the front side (operational side) of the apparatus.

As described above, four photoreceptor drums 3 are prepared for respective colors of Y, M, C, and K. The cylindrical lens 220 of the secondary optical system is provided below each photoreceptor drum 3 to make the light beam converge on the photoreceptor drum 3 for each color. Each cylindrical lens 220 is held within the metal frame 224. To adjust the angle of the cylindrical lens 220, the metal frame 224 is provided with the rear supporting portion 225 and the front supporting portion 229. Although the cylindrical lens 220 may be directly supported by each supporting portion 225, 229 without using the frame 24, if the cylindrical lens 220 is held within the frame 224, unwanted stress is not applied to the cylindrical lens 220 and the characteristics thereof can be stabilized.

The rear supporting portion 225 rotatably supports the frame 224 so that it can be rotated in the direction of an arrow C at the rear side of the image forming apparatus. Because of the elongate hole 230 formed in the frame 224, the front supporting portion 229 is configured such that a support shaft of the front supporting portion 229 can be displaced in the elongate hole 230 and, therefore, the frame 224 can be slightly rotated around the axis of the rear supporting portion 225.

In the image forming apparatus, the photoreceptor drum 3 is positioned by and attached to a bearing portion on the wall of the rear side of the apparatus. The position displacement of the photoreceptor drum 3 is often generated when the photoreceptor drum 3 is displaced on the front side of the apparatus in the sub-scanning direction with the rear side of the apparatus acting as a fulcrum. The bearing portion of the photoreceptor drum 3 on the rear side of the apparatus has essentially a very high accuracy and, when the photoreceptor drum 3 is attached, the bearing portion on the rear side is hardly displaced in the sub-scanning direction.

Therefore, for the cylindrical lens 220 of the secondary optical system, the rear supporting portion 225 is provided in a portion located on the rear side of the apparatus for slightly rotating the frame 224 around the axis of the rear supporting portion 225 and, by performing the operation similar to the operation for adjusting the position displacement generated in the photoreceptor drum 3, the angle can be adjusted relative to the photoreceptor drum 3.

Figure 12:
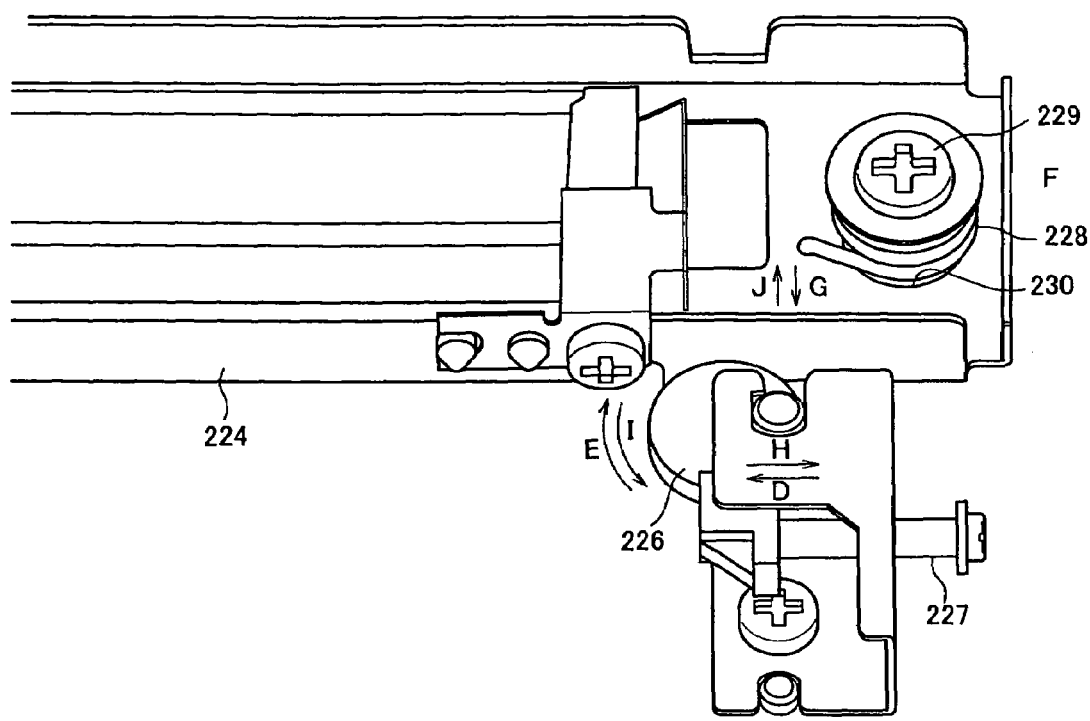
FIG. 12 is a relevant part enlarged schematic diagram for describing an adjustment mechanism for adjusting the angle of the cylindrical lens of the secondary optical system.

FIG. 12 is a relevant part enlarged schematic diagram for describing the adjustment mechanism for adjusting the angle of the cylindrical lens of the secondary optical system. The angle of the cylindrical lens 220 can be adjusted in the sub-scanning direction by advancing or retracting the adjustment screw 227. A lateral face of the front end of the frame 224 supporting the cylindrical lens 220 contacts with the eccentric cam 226. When the adjustment screw 227 is adjusted in the direction of an arrow D, the eccentric cam 226 is rotated in the direction of an arrow E, presses the lateral face of the frame 227, and displaces it in the direction of an arrow J. Since the frame 224 is rotatably supported on the rear side of the apparatus, the frame 224 is rotatably displaced, by the displacement in the direction of the arrow J, around the axis of the rear supporting portion 225 on the rear side of the apparatus. Since the eccentric cam 226 contacts with the frame 224, unwanted stress is not applied to the cylindrical lens 220.

The spring member 228 is installed at a lateral end portion of the front side of the frame 224 for the cylindrical lens 220 and biases the frame 224 toward the chassis 223 of the secondary optical system in the direction of an arrow G. When the adjustment screw 227 is adjusted in the direction of an arrow H, the eccentric cam 226 is rotated in the direction of an arrow I and the frame 224 is displaced in the direction of the arrow G by the biasing effect of the spring member 228.

With such a configuration, the angle of the cylindrical lens 220 can be adjusted in the sub-scanning direction by the adjustment screw 227. In this configuration, since the adjustment screw 227 is installed on the front side of the apparatus (i.e., operating side of the image forming apparatus), the adjustment can be easily performed, as is the case with the adjustment mechanism for the second/third mirror 111, 113.

Description will be made of an example of the adjustment of the main optical elements at the time of assembling the optical scanning unit. In the optical scanning unit of the embodiment, the first optical system and the second optical system are configured as respective units and the optical scanning unit is constituted by combining the respective optical systems.

The first optical system is constituted by disposing each optical element on the base 120 made of die-casting such as aluminum, for example. The positioning accuracy of the optical system is ensured by the integral configuration on the die-cast base 120. The secondary optical system is constituted by disposing each optical element within the chassis 223. As shown in FIG. 4B, the die-cast unit of the primary optical system is incorporated into the installation position 222 under the chassis 223 where the secondary optical system is disposed. In the primary optical system and the secondary optical system, the optical elements such as lenses and mirrors are configured to be removable.

The primary optical system unit is incorporated such that the optical elements are disposed on the under side of the die-cast base 120. That is, the primary optical system unit is manufactured by disposing the optical elements on the die-cast base 120, and the obtained unit is incorporated upside down into the predetermined installation position 222 within the chassis 223 of the secondary optical system from the under side (bottom side) of the chassis 223. Since the primary optical system is incorporated upside down from the under side, it is advantageous that no wiring appears on the side of the optical elements such as mirrors, which makes wiring easier.

In the unit configuration of the primary optical system and the secondary optical system, positioning means such as pedestals of the optical elements may be created in advance on the die-cast base 120 or on the wall of the chassis 223 to support the changes in the usage or design of the image forming apparatus as much as possible. For example, if the specification of the laser diode 101 is changed to replace with a different type of the laser diode (e.g., a laser diode provided with two laser emitting portions for scanning two lines at the same time), the correction of the optical path may be needed due to the replacement of the laser diode.

The accuracy of the optical elements of the primary optical system is ensured by disposing and integrating the optical elements at the predetermined positions on the die-cast base. In the embodiment, to support the changes in the specification as described above, the positioning means such as a pedestal, a groove, or a supporting protruding portion are formed in advance at installation position of each optical element for the changes in the specification.

When the specification is changed, the base 120 of the primary optical system is removed from the optical scanning unit to remove the optical elements and the necessary optical elements are disposed at the predetermined positioning means. The optical elements may be replaced as needed or only the installation position thereof may be relocated.

With such a configuration, each optical element can be disposed accurately when the specification is changed, and even if the specification is changed, the optical elements can be continuously used depending on the specification, which has a considerable effect on costs. In the primary optical system, since the light beams are parallel light and the optical axes of the four light beams are parallel to each other between the collimator lenses 102 and the cylindrical lens 112, an optical path length can be freely set and the apparatus can flexibly deal with space restrictions.

The positioning means of the optical elements for the specification changes can be applied to the secondary optical system unit. For example, if the printing speed (image formation speed) is to be speeded up, the diameter of the photoreceptor drum 3 may be increased. Since the optical path length from the second fθ lens 203 to the cylindrical lens 220 is the same in the second optical system for each color of Y, M, C, and K, the position of the cylindrical lens 220 and the position of the mirror guiding the light beam to the cylindrical lens 220 must be changed to support such specification changes. To support such specification changes, the positioning means such as a pedestal, a groove, or a supporting protruding portion are formed in advance at an assumed installation position of each optical element for the changes in the specification. When the specification is changed, the necessary optical elements are removed and the necessary optical elements are disposed at the predetermined positioning means.

With such a configuration, each optical element can be disposed accurately when the specification is changed, and if the specification is changed, the optical elements can be continuously used depending on the specification. Especially in the second optical system, by continuously using the expensive fθ lens after the specification change, a considerable effect on costs can be obtained.

Figure 13A:
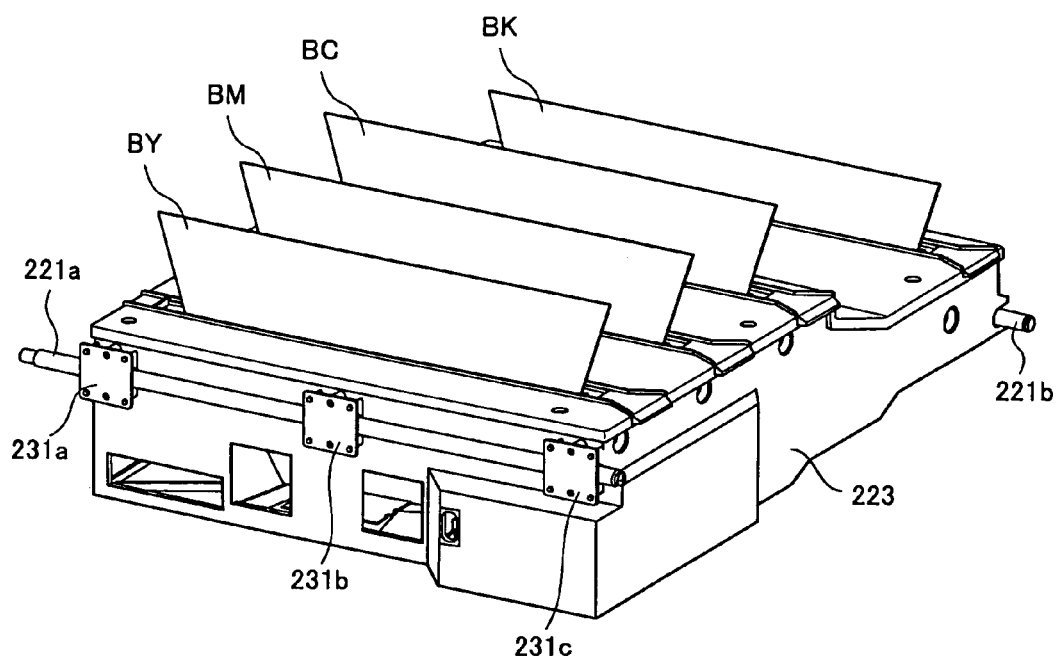
FIGS. 13A and 13B are diagrams for describing a shaft configuration for fixing the optical scanning unit within the image forming apparatus at a predetermined position.
Figure 13B:
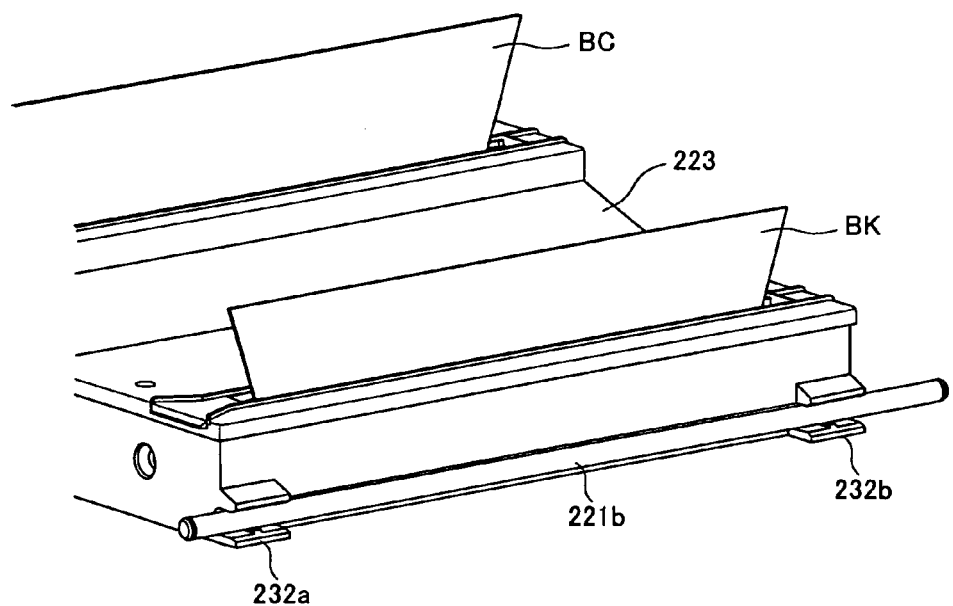

FIGS. 13A and 13B are diagrams for describing a shaft configuration for fixing the optical scanning unit at a predetermined position within the image forming apparatus; FIG. 13A is a perspective schematic diagram of the exposure unit 1 viewed from the left of the operational side; and FIG. 13B is a perspective schematic diagram of the exposure unit viewed from the right of the operational side. In FIGS. 13A and 13B, a numeral 221a is a first fixing shaft; a numeral 221b is a second fixing shaft; numerals 231a to 231c are fixing members for fixing the first fixing shaft; numerals 232a and 232b are engaging portions for engaging with the second fixing shaft; and BK, BC, BM, and BY schematically show the light beams of K (black), C (cyan), M (magenta), and Y (yellow), respectively.

The optical scanning unit is constituted by disposing the optical elements of the second optical system within the chassis 223 and by disposing the primary optical system unit at a predetermined position within the chassis 223 as described above. In this way, the optical scanning unit is formed as a unit within the chassis 223 and is configured to be removable from the image forming apparatus such as a printer.

The image forming apparatus is provided with the optical scanning unit (exposure unit) as described above and exposes the photoreceptor drum 3 by the optical scanning unit according to the image data. In this embodiment, since the optical scanning unit is formed as a unit within the chassis 223, the optical scanning unit can be attached to and detached from the main body of the image forming apparatus. For example, in the case of the specification change such as speeding up of the image formation, the specification change can be accommodated by replacing the optical elements of the primary optical system or the second optical system or by changing their arrangement, or the optical scanning unit itself can be configured to be exchangeable.

As shown in FIG. 4B, to fix the chassis 223 of the optical scanning unit within the image forming apparatus, two fixing shafts 221a, 221b are attached to the both sides of the chassis 223 of the optical scanning unit. Within the frame of the main body of the image forming apparatus, supporting portions are provided for fixedly supporting each fixing shaft 221a, 221b, and the chassis 223 is fixed to the fixedly supported shafts 221a, 221b. That is, the chassis 223 of the optical scanning unit is held within the main body of the image forming apparatus by the two fixing shafts 221a, 221b.

The fixing shafts 221a, 221b fixed to the chassis 223 are provided such that the longitudinal directions thereof are the same as the direction parallel to the axis direction of the photoreceptor drum 3 (i.e., main scanning direction). By inserting the optical scanning unit from the front side to the rear side of the image forming apparatus, the optical scanning unit is positioned at a predetermined position, and the engaging portions 232a, 232b (FIG. 13B) provided on the chassis 223 are engaged with the second fixing shaft 221b, and the chassis 223 is fixed to the first fixing shaft 221a with the use of the fixing members 231a to 231c.

Figure 14A:
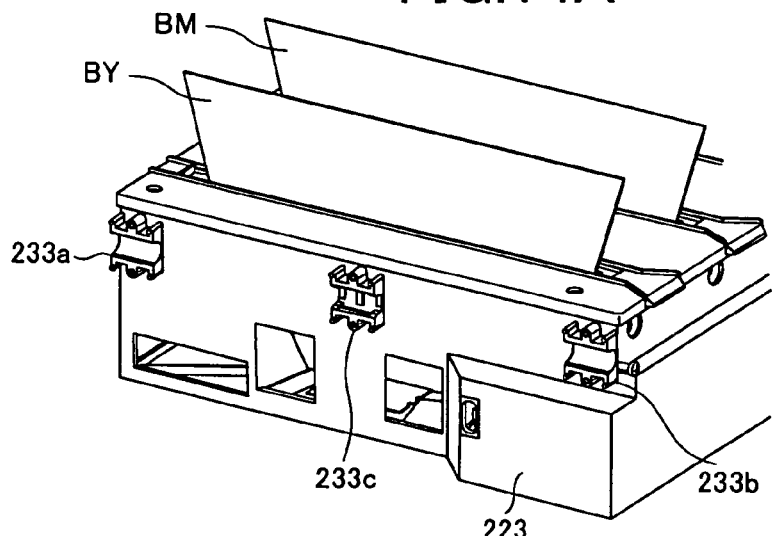
Figure 14B:
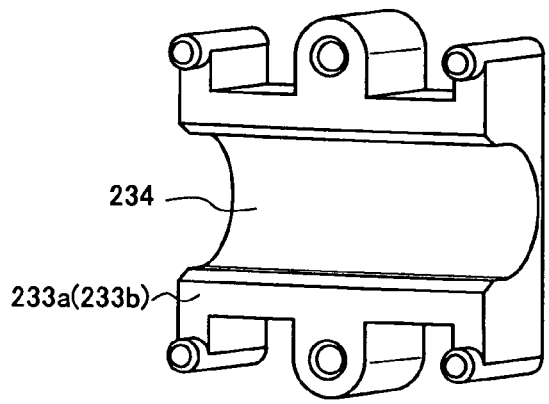
Figure 14C:
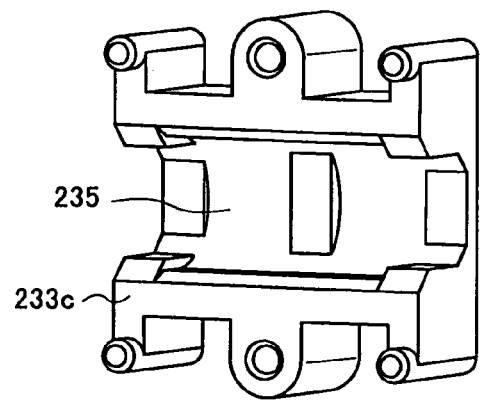
Figure 14D:
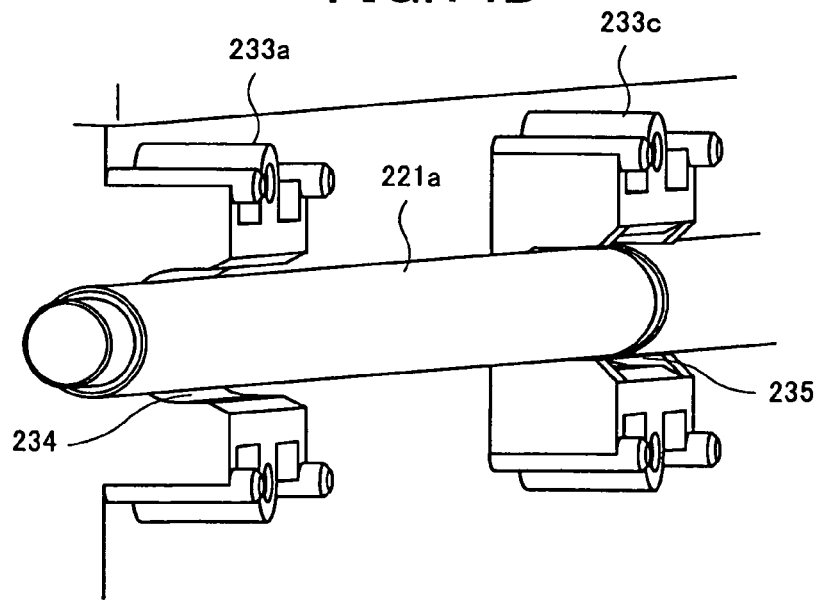

FIGS. 14A to 14D are diagrams for describing a mechanism that fixes the first fixing shaft 221a; FIG. 14A is a perspective schematic diagram of a relevant part of the chassis; FIG. 14B shows first and second supporting members disposed on the rear side and the front side of the apparatus; FIG. 14C shows a third supporting member disposed near the middle of the first and second supporting members; and FIG. 14D shows how the first fixing shaft is engaged with the first supporting member and the third supporting member. In FIGS. 14A to 14D, a numeral 233a is the first supporting member; a numeral 233b is the second supporting member; a numeral 233c is a third supporting member; a numeral 234 is a groove portion of the first (or second) supporting member; and a numeral 235 is a groove portion of the third supporting member.

As shown in FIG. 14A, to the left of the chassis 233 viewed from the operational side, the first to third supporting members 233a to 233c are provided for supporting and fixing the first fixing shaft 221a. The first and second supporting member 233a, 233b are provided on the rear side and the front side (operational side) of the apparatus, respectively, and the third supporting member is provided therebetween.

The respective supporting members 233a to 233c are provided with the groove portions 234, 235 for supporting the first fixing shaft 221a. The first fixing shaft 221a is supported by the groove portions 234, 235 and can be moved in the axis direction of the photoreceptor drum 3. When the first fixing shaft 221a is disposed in the groove portions 234, 235 of the respective supporting members, the first fixing shaft 221a is fixed to the respective supporting members 233a to 233c by attaching the fixing members 231a to 231c as shown in FIG. 13A to the respective supporting members 233a to 233c. Since the engaging portions 232a, 232b of the chassis 223 are engaged with the second fixing shaft 221b, the chassis 223 is fixed to the respective fixing shafts 221a, 221b in this way.

Among the supporting members 233a to 233c, the supporting member actually supporting the chassis is the third supporting member 233c in the middle. As shown in FIGS. 14B and 14C, a shape of the groove portions 234 provided in the first and second supporting member 233a, 233b is different from a shape of the groove portion 235 provided in the third supporting member 233c. That is, the first fixing shaft 221a contacts with the inner wall surface of the groove portion 235 of the third supporting member 233c and is supported by the inner wall surface of the groove portion 235.

On the other hand, the groove portions 234 of the first and second supporting member 233a, 233b are configured such that the upper and lower inner wall surfaces are located away from the surface of the first fixing shaft 221a. That is, the first fixing shaft 221a is loosely inserted into the groove portions 234 with upper and lower gaps.

When the first fixing shaft 221a is supported by the respective supporting members 233a to 233c, as shown in FIG. 14D, with respect to the vertical direction, the first fixing shaft 221a is supported at one point of the third supporting member 233c, and the first and second supporting members 233a, 233b do not support the first fixing shaft 221a. The first and second supporting members 233a, 233b mainly support the first fixing shaft 221a with respect to the horizontal direction.

That is, with the configuration as described above, the chassis 223 is supported at three points, which are one point at the center part of the first fixing shaft 221a and two points of the second fixing shaft 221b. Since there are three supporting points in this configuration, the three points define a plane to enhance the stability of the support of the chassis 223.

Of course, the first fixing shaft 221a may be supported at two or more supporting points and the chassis 223 may be supported at four or more supporting points. Although the credibility is enhanced because more supporting points exist in this case, if one or more supporting point(s) of the four or more supporting points is/are displaced from the plane including other supporting points, rattling is generated, which is not preferred for the stability of the support. Means may be added for finely adjusting the respective fixing shaft 221a, 221b in the sub-scanning direction and, by this means, the tilt of the optical scanning unit can be adjusted in the sub-scanning direction relative to the photoreceptor drum 3.

Description will be made of an example of a technique for adjusting the position of each optical element at the time of assembling of the optical scanning unit. First, the laser diode 101 is attached to the body tube 107 (including the collimator lens 102 and the aperture 103) and made to emit the light to verify the light beam on an arbitrary screen. Since the light beam emitted from the body tube 107 is parallel light, the beam diameter on the screen is constant regardless of the distance to the screen. The above verification is performed for the four laser diodes 101 for Y, M, C, and K to check that the parallel light is emitted from all the laser diodes.

The four body tubes and laser diodes 101 are attached to the predetermined positions on the base of the primary optical system, and the laser diodes 101 are made to emit the light. The cylindrical lens 112 of the primary optical system has been removed. The light beams emitted from the four laser diodes 101 are projected on an arbitrary screen to check whether the four beams have predetermined intervals or not. That is, since the four light beams travel with the optical axes parallel to each other after the emission from the collimator lenses 102, the four light beams projected on the screen have constant intervals. In this case, the beam intervals are constant regardless of the distant to the screen. By verifying such behaviors, it is checked that each of the four beams is parallel light and that the optical axes of the four beams are parallel to each other. When the beam interval is checked, the distance between the centroids of the light beams may be checked.

The optical elements such as the cylindrical lens 112 of the primary optical system are disposed at predetermined positions and the primary optical system unit is incorporated at the predetermined installation position 222 of the chassis 223 of the secondary optical system. The emission of the laser diode 101 is performed to check that four emitted beams converge on the reflection face of the polygon mirror 201.

A screen is placed between the second fθ lens 203 and the cylindrical lenses 220 of the secondary optical system to project four light beams emitted from the second fθ lens 203. It is verified that the four light beams are projected on the screen at predetermined intervals in the sub-scanning direction.

Another screen is placed between the second fθ lens 203 and the cylindrical lenses 220 of the secondary optical system to verify that the four light beams are projected on the two screens at the same beam intervals. Since the optical axes of the four light beams after being emitted from the second fθ lens 203 are parallel to each other at predetermine intervals in the sub-scanning direction, it can be checked by verifying the beams projected on two screen as described above whether the optical systems are in an optimum state or not.

If the four beams are not arranged at the predetermined intervals on the screen, the primary optical system, for example, the second mirror 111 or the third mirror 113 is adjusted such that the light beams behave desirably.

According to the present invention, effects as follows can be obtained.

According to the present invention, in the adjustment mechanism that adjusts the angles and positions of the optical elements constituting the optical scanning unit, highly accurate adjustment can be easily performed. That is, according to the present invention, with regard to the optical elements such as mirrors and lenses on the optical path that guides the light beam emitted from the laser diode to the photoreceptor drum for each color, the adjustment of the light beam can be performed highly accurately and easily by providing the adjustment mechanism that can adjust angles and positions of the optical elements relative to the light beam made incident on the optical elements.

Particularly, the cylindrical lens for making the light beam converge on the photoreceptor is held by the frame that is a reinforcing member; the frame is supported at two support portions for the chassis; the optical scanning unit is configured such that the angle of the cylindrical lens in the longitudinal direction is adjustable in the sub-scanning direction of the photoreceptor at one of the support portions; and, therefore, the cylindrical lens can be adjusted accurately in conformity to the photoreceptor. Since the frame is provided, unwanted stress is not applied to the cylindrical lens at the time of the angle adjustment of the cylindrical lens and the characteristics of the cylindrical lens can be stabilized.

According to the present invention, since the cylindrical lens is made of resin, a long lens covering the entire scanning width can be formed accurately.

Further, according to the present invention, since the adjustment mechanism is disposed on one side of the unit configured to be the optical scanning unit, for example, on an operational side (front side) of the image forming apparatus when the optical scanning unit is incorporated into the image forming apparatus, the optical elements can be easily adjusted from the operational side of the image forming apparatus.

The invention claimed is:

1. An optical scanning unit that irradiates a polygon mirror with a plurality of light beams emitted from a light source according to image data, the optical scanning unit converting the plurality of light beams to scanning lights by the rotation of the polygon minor, the optical scanning unit scanning and exposing a plurality of photoreceptors simultaneously with the plurality of scanning lights to form latent images on the respective photoreceptors, the optical scanning unit comprising:

a chassis having a cylindrical lens that makes the light beam for exposing the photoreceptor converge on the surface of the photoreceptor, wherein the cylindrical lens is supported by two support portions for the chassis such that the longitudinal direction of the cylindrical lens becomes parallel to the scanning direction of the photoreceptor and the optical scanning unit is configured such that the angle of the cylindrical lens in the longitudinal direction is adjustable in the sub-scanning direction of the photoreceptor at one of the support portions by an eccentric cam.

2. An optical scanning unit that irradiates a polygon mirror with a plurality of light beams emitted from a light source according to image data, the optical scanning unit converting the plurality of light beams to scanning lights by the rotation of the polygon mirror, the optical scanning unit scanning and exposing a plurality of photoreceptors simultaneously with the plurality of scanning lights to form latent images on the respective photoreceptors, the optical scanning unit comprising:

a chassis having a cylindrical lens that makes the light beam for exposing the photoreceptor converge on the surface of the photoreceptor and a frame that holds the cylindrical lens therein, wherein the frame is supported by two support portions for the chassis such that the longitudinal direction of the cylindrical lens becomes parallel to the scanning direction of the photoreceptor and the optical scanning unit is configured such that the angle of the cylindrical lens in the longitudinal direction is adjustable in the sub-scanning direction of the photoreceptor at one of the support portions by an eccentric cam.

3. The optical scanning unit of claim 1, wherein the cylindrical lens is made of resin.

4. An image forming apparatus comprising the optical scanning unit of claim 1 and the photoreceptors, wherein the optical scanning unit forms latent images on the photoreceptors, the latent images being developed for image formation.

5. The optical scanning unit of claim 2, wherein the cylindrical lens is made of resin.

6. An image forming apparatus comprising the optical scanning unit of claim 2 and the photoreceptors, wherein the optical scanning unit forms latent images on the photoreceptors, the latent images being developed for image formation.

* * * * *